(12) United States Patent
Minamitani

(10) Patent No.: US 10,516,141 B2
(45) Date of Patent: Dec. 24, 2019

(54) POWER STORAGE DEVICE AND PRODUCTION METHOD THEREOF

(71) Applicant: SHOWA DENKO PACKAGING CO., LTD., Isehara-shi, Kanagawa (JP)

(72) Inventor: Koji Minamitani, Isehara (JP)

(73) Assignee: SHOWA DENKO PACKAGING CO., LTD., Kanagawa (JP)

( * ) Notice: Subject to any disclaimer, the term of this patent is extended or adjusted under 35 U.S.C. 154(b) by 352 days.

(21) Appl. No.: 15/044,242

(22) Filed: Feb. 16, 2016

(65) Prior Publication Data

US 2016/0248052 A1 Aug. 25, 2016

(30) Foreign Application Priority Data

Feb. 23, 2015 (JP) .................................. 2015-32702

(51) Int. Cl.
| | |
|---|---|
| *H01M 2/02* | (2006.01) |
| *H01M 10/0525* | (2010.01) |
| *H01M 2/08* | (2006.01) |
| *H01M 10/0587* | (2010.01) |
| *H01M 2/24* | (2006.01) |
| *H01G 11/32* | (2013.01) |
| *H01M 10/0585* | (2010.01) |

(52) U.S. Cl.
CPC ........... *H01M 2/0207* (2013.01); *H01M 2/08* (2013.01); *H01M 2/24* (2013.01); *H01M 10/0585* (2013.01); *H01M 10/0587* (2013.01); *H01M 2220/30* (2013.01)

(58) Field of Classification Search
CPC combination set(s) only.
See application file for complete search history.

(56) References Cited

U.S. PATENT DOCUMENTS 3,775,188 A * 11/1973 Oltman .................. H01M 6/46
  29/623.3
4,609,597 A * 9/1986 Plasse ..................... H01M 2/12
  429/122

(Continued)

FOREIGN PATENT DOCUMENTS

| JP | 55-107225 A | 8/1980 |
| JP | 2000-173559 A | 6/2000 |

(Continued)

*Primary Examiner* — Kaity V Chandler
(74) *Attorney, Agent, or Firm* — Keating and Bennett, LLP

(57) ABSTRACT

In an external member, peripheral edge regions of first and second metal foil layers are joined via a periphery sealing portion containing thermoplastic resin. A plurality of bare cells are arranged separately in internal spaces surrounded by the first metal foil layer, the second metal foil layer and the periphery sealing portion. The partition region of the first metal foil layer between adjacent bare cells and the partition region of the second metal foil layer between adjacent bare cells are joined via the partition sealing portion. Thus, the internal space is partitioned into a plurality of independent individual spaces. At each individual space, the first metal foil inner exposed portion and the positive electrode portion are connected electrically, and the negative electrode portion of the second metal foil inner exposed portion and the bare cell are connected electrically. The bare cell and electrolyte are encapsulated in each individual space.

5 Claims, 12 Drawing Sheets

(56) References Cited

U.S. PATENT DOCUMENTS

| | | | | |
|---|---|---|---|---|
| 6,528,204 B1* | 3/2003 | Hikmet | ................... | H01M 4/13 |
| | | | | 429/128 |
| 6,617,074 B1* | 9/2003 | Watarai | ................... | H01M 2/18 |
| | | | | 429/127 |
| 9,786,893 B2* | 10/2017 | Kwon | ................... | H01M 2/204 |
| 2002/0061436 A1* | 5/2002 | Inagaki | ............... | H01M 2/0212 |
| | | | | 429/120 |
| 2003/0059673 A1* | 3/2003 | Langan | ............... | H01M 2/0215 |
| | | | | 429/127 |
| 2003/0134190 A1* | 7/2003 | Ishida | ................ | H01M 2/0207 |
| | | | | 429/162 |
| 2004/0086781 A1* | 5/2004 | Fukuzawa | ............... | H01M 2/14 |
| | | | | 429/129 |
| 2008/0076030 A1* | 3/2008 | Inagaki | ................ | H01M 4/623 |
| | | | | 429/330 |
| 2008/0182157 A1* | 7/2008 | Visco | .................... | H01B 1/122 |
| | | | | 429/50 |
| 2014/0017574 A1* | 1/2014 | Ito | ......................... | H01M 4/366 |
| | | | | 429/332 |
| 2014/0079984 A1* | 3/2014 | Kajitani | ................. | H01M 2/08 |
| | | | | 429/162 |
| 2014/0162108 A1* | 6/2014 | Visco | .................... | H01M 4/13 |
| | | | | 429/131 |
| 2014/0197796 A1* | 7/2014 | Sasaki | ................ | H01M 2/0217 |
| | | | | 320/128 |
| 2016/0099454 A1* | 4/2016 | Kwon | ................... | H01M 2/204 |
| | | | | 429/159 |

FOREIGN PATENT DOCUMENTS

| | | |
|---|---|---|
| JP | 2008-251381 A | 10/2008 |
| WO | 2012/140709 A1 | 10/2012 |

\* cited by examiner

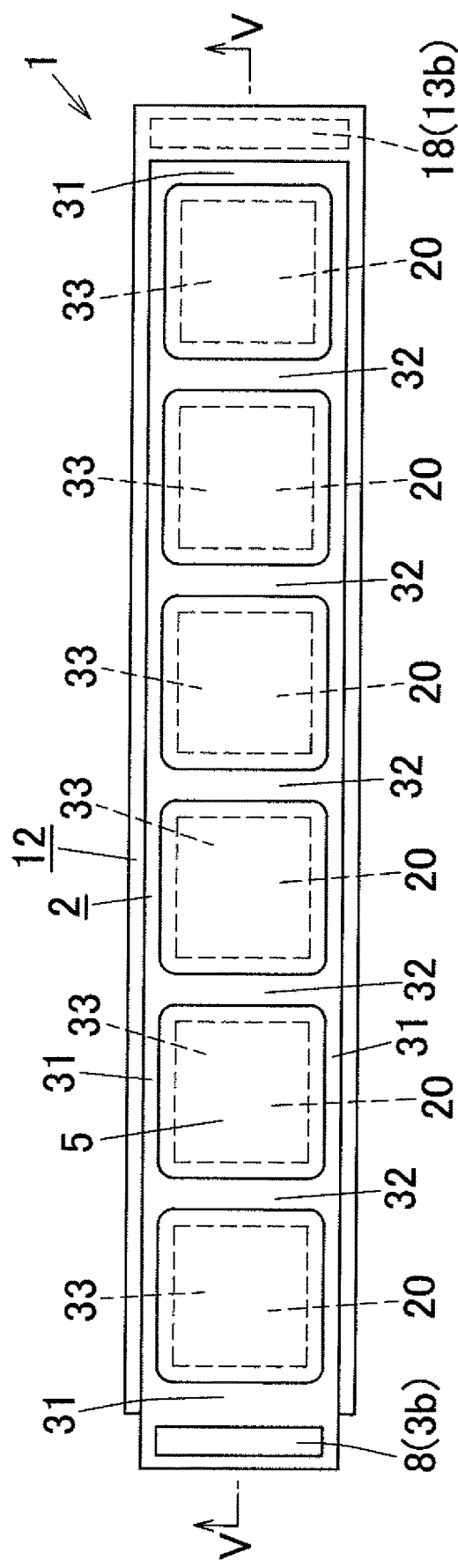
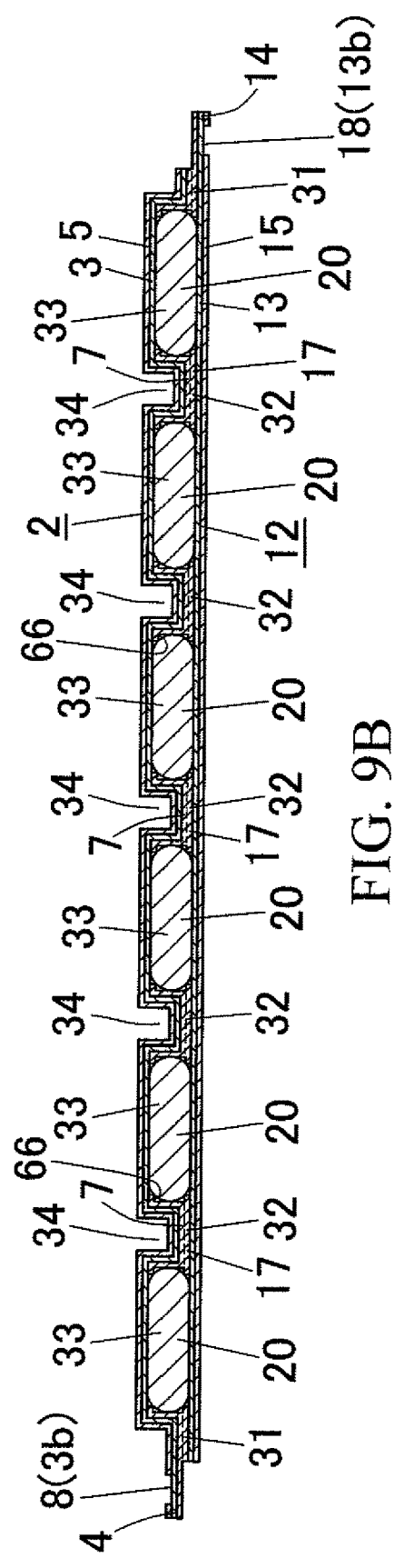
FIG. 9A
FIG. 9B

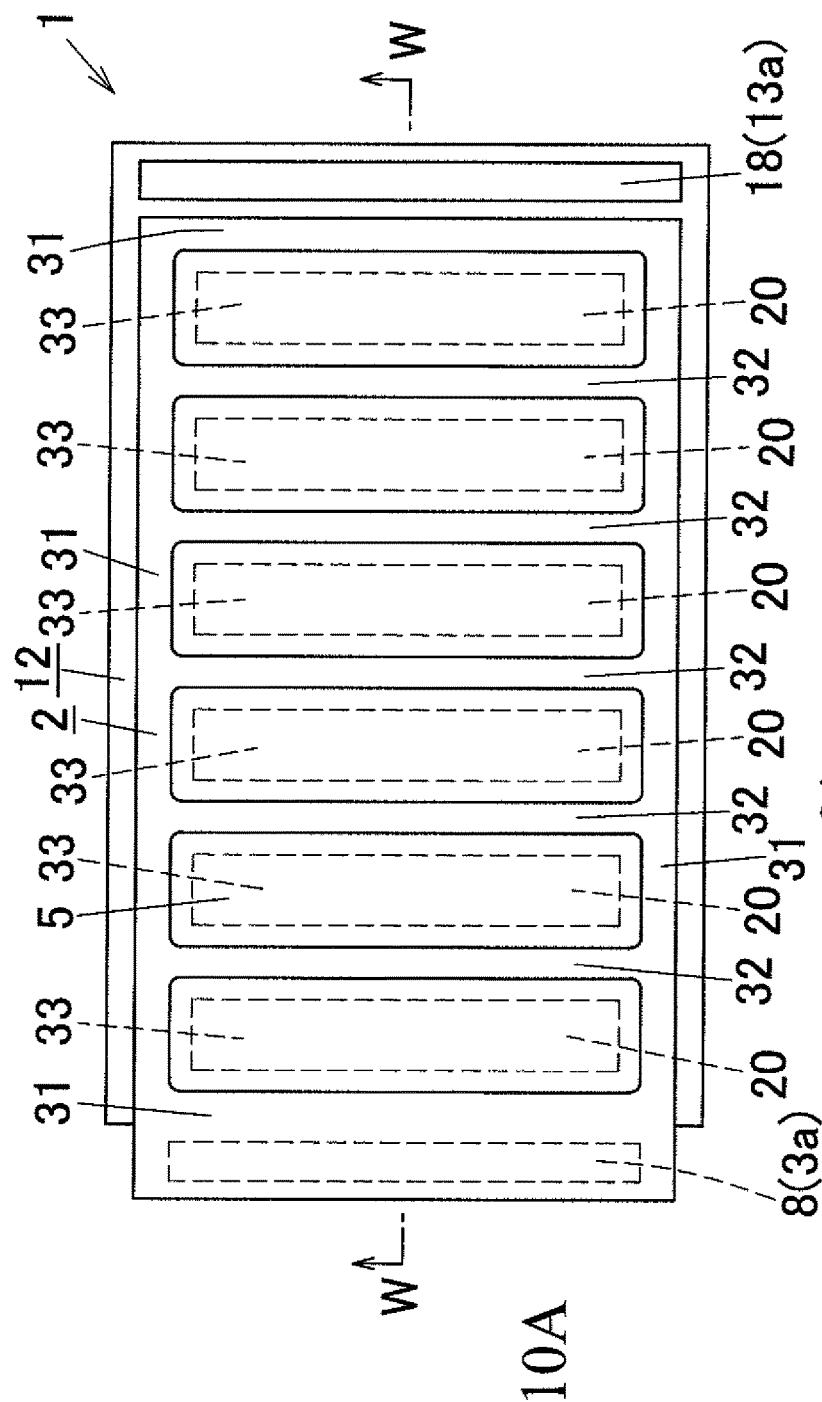
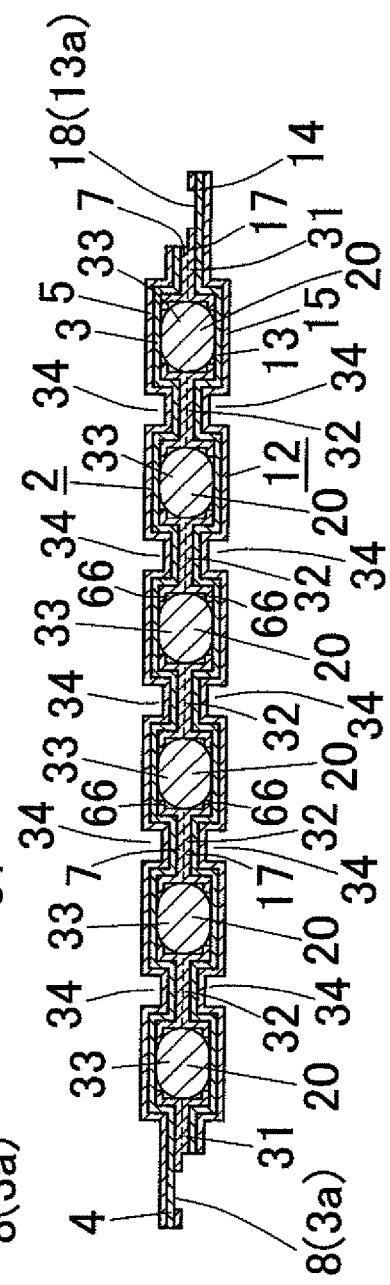
FIG. 10A
FIG. 10B

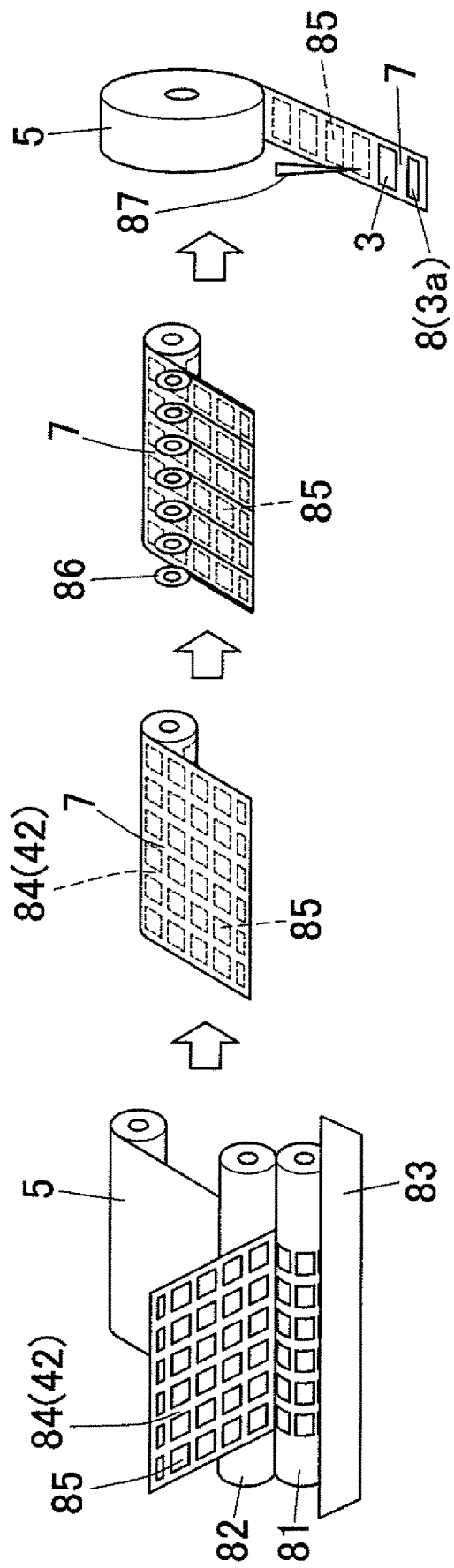

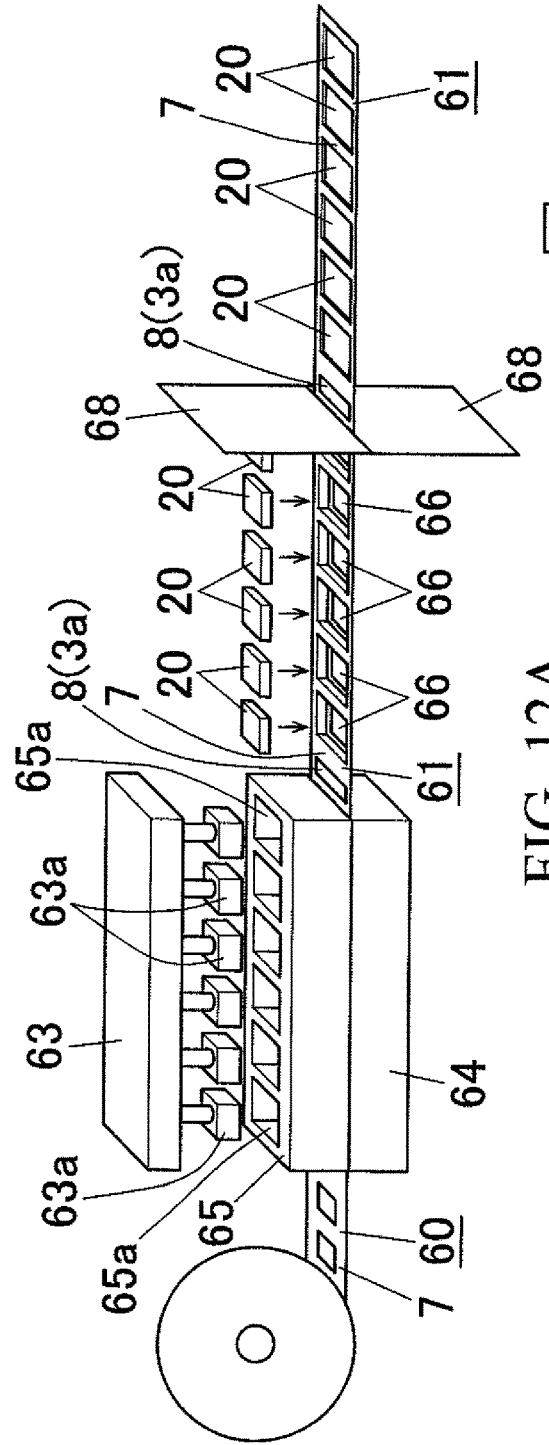
FIG. 12A
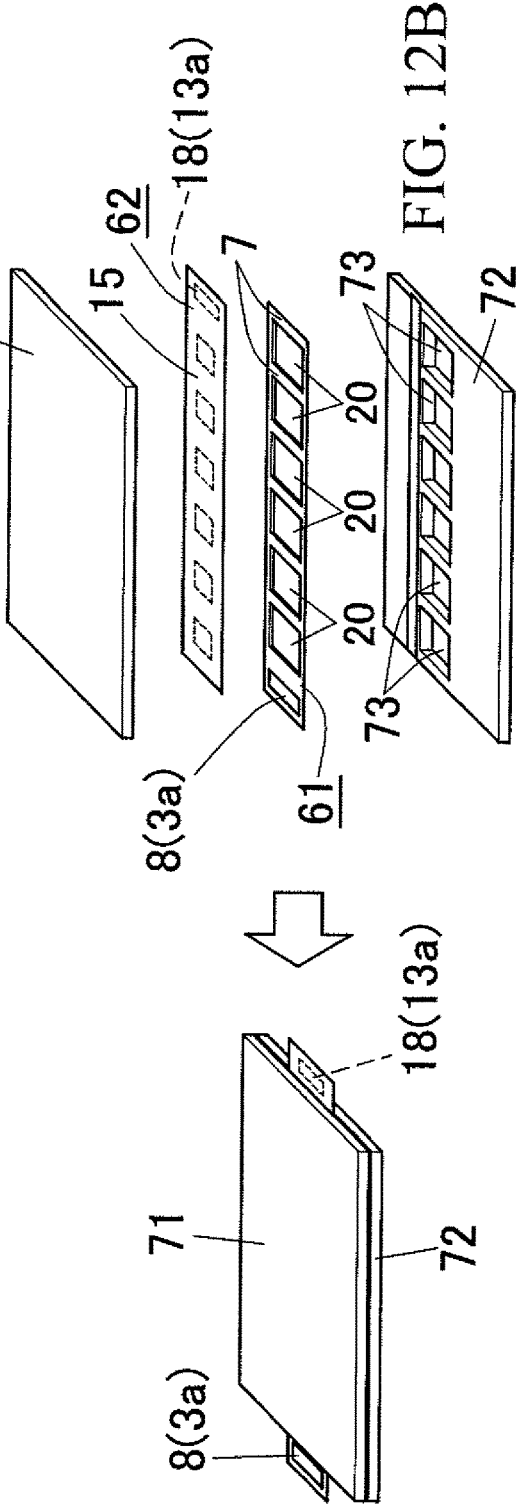
FIG. 12B
FIG. 12C

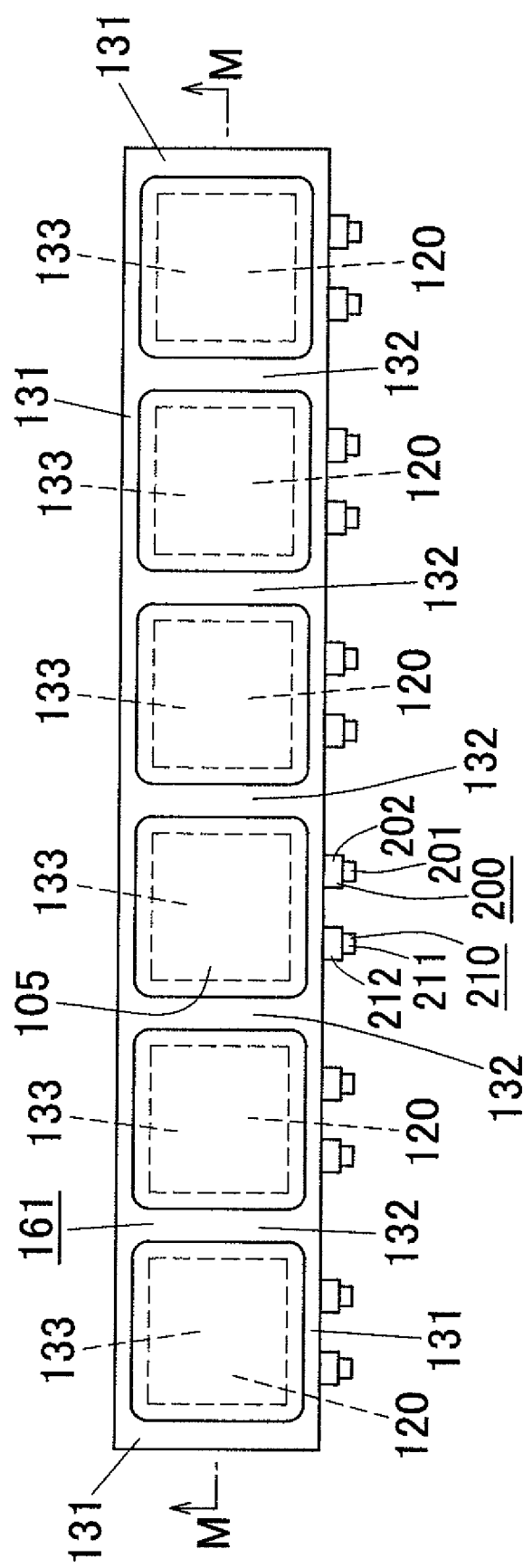
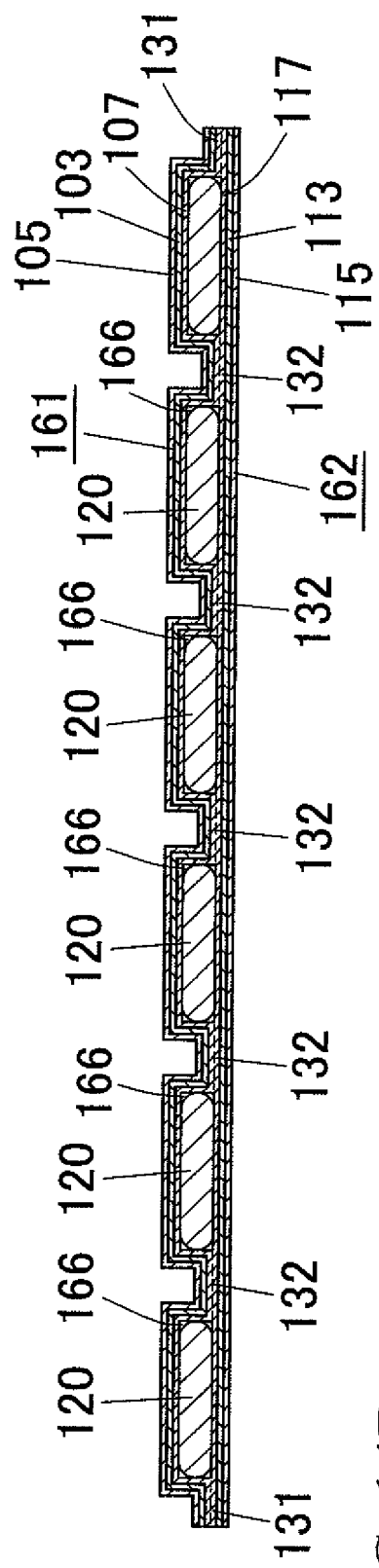
FIG. 14A
FIG. 14B

POWER STORAGE DEVICE AND PRODUCTION METHOD THEREOF

CROSS-REFERENCE TO THE RELATED APPLICATIONS

The present application claims priority to Japanese Patent Application No. 2015-32702 filed on Feb. 23, 2015, the entire disclosure of which is incorporated herein by reference in its entirety.

BACKGROUND OF THE INVENTION

Technical Field

The present disclosure relates to a power storage device capable of being bent or curved and realizing a high capacity, and also relates to a production method thereof.

Description of the Related Art

The following description of related art sets forth the inventor's knowledge of related art and certain problems therein and should not be construed as an admission of knowledge in the prior art.

In accordance with thinning and lightweighting of a mobile device, such as, e.g., a smart phone and a tablet terminal, as an external member for a lithium-ion secondary battery or a lithium-polymer secondary battery to be mounted on the mobile device, in place of a conventional metallic can, a laminated external member in which resin films are adhered on both surfaces of a metal foil is used. Similarly, it is being considered to mount an electrical condenser, a capacitor, etc., using a laminated external member on an IC card or an electronic device as a backup power source.

Further, in recent years, along with an increase in size of a smart phone or a tablet terminal, it is being considered to make a device itself bendable, and also in a wearable electronic device represented by a smart watch and a smart glass, it is being considered to mount a small and lightweight laminate battery using a laminate external member.

In order to make a smart phone or a tablet terminal bendable, it is required to make various electronic devices including batteries flexible against bending, curving, etc., in addition to make the casing of such a device flexible. Further, even in an electronic device, such as, e.g., a wearable electronic device, etc., to be fitted on a human body, it is required to make various electronic devices such as batteries flexible.

As a device causing no problem even if the battery is bent as mentioned above, it is proposed to use a thin sheet-type battery (see Japanese Unexamined Laid-open Patent Application Publication No. 2000-173559 (hereinafter referred to as "Patent Document 1"), International Publication No. 2012/140709 pamphlet (WO2012/140709) (hereinafter referred to as "Patent Document 2").

However, in a thin sheet-like battery which is reduced in thickness to secure the flexibility, the number of stacking electrodes decreases and the electron accumulation layer such as an active material becomes thin, resulting in a reduced electric capacity. As a result, mounting such a battery on an electronic device causes a problem that the charge-discharge cycle becomes short. In order to increase a capacity of a battery, there is no option but to increase the number of stacking electrodes or increase the size of the electrode. However, in the former structure, the battery cannot be curved or bent. On the other hand, in the latter structure, the size of the battery becomes large, which limits devices capable of mounting such a large battery.

The description herein of advantages and disadvantages of various features, embodiments, methods, and apparatus disclosed in other publications is in no way intended to limit the present invention. For example, certain features of the preferred described embodiments of the invention may be capable of overcoming certain disadvantages and/or providing certain advantages, such as, e.g., disadvantages and/or advantages discussed herein, while retaining some or all of the features, embodiments, methods, and apparatus disclosed therein.

SUMMARY OF THE INVENTION

The disclosed embodiments of this disclosure have been developed in view of the above-mentioned and/or other problems in the related art. The disclosed embodiments of this disclosure can significantly improve upon existing methods and/or apparatuses.

Some embodiments of the present disclosure were made in view of the aforementioned technical background, and aim to provide a power storage device capable of repeatedly being bent or curve and realizing a high capacity, and a production method thereof.

The other purposes and advantages of some embodiments of the present disclosure will be made apparent from the following preferred embodiments.

To attain the aforementioned objects, some embodiments of the present disclosure provide the following means.

[1] A power storage device include a first external member including at least a first metal foil layer, a second external member including at least a second metal foil layer; and at least one bare cell including a positive electrode portion in which a positive electrode active material layer is laminated on one surface of a positive electrode side metal foil, a negative electrode portion in which a negative electrode active material layer is laminated on one surface of a negative electrode side metal foil, and a separator arranged between the positive electrode portion and the negative electrode portion. The at least one bare cell includes a plurality of bare cells. A peripheral edge region of one surface of the first metal foil layer and a peripheral edge region of one surface of the second metal foil layer are joined via a periphery sealing portion containing a thermoplastic resin. In an internal space surrounded by the first metal foil layer, the second metal foil layer, and the periphery sealing portion, the plurality of bare cells are arranged in a separated manner. A partition region between adjacent bare cells on the one surface of the first foil layer and a partition region between adjacent bare cells on the one surface of the second metal foil layer are joined via a partition sealing portion containing a thermoplastic resin. An internal space surrounded by the first metal foil layer, the second metal foil layer, and the periphery sealing portion is divided into a plurality of independent individual spaces by the partition sealing portion. At least a part of a region of the one surface of the first foil layer corresponding to each individual space is provided with a first metal foil inner exposed portion in which the first metal foil is exposed, and in each individual space, the first metal foil inner exposed portion and the positive electrode portion of the bare cell are electrically connected. At least a part of a region of the one surface of the second metal foil layer corresponding to each individual space is provided with a second metal foil inner exposed portion in which the second metal foil is exposed, and in each individual space, the second metal foil inner exposed portion and the negative electrode portion of the bare cell are electrically connected. In each individual space, the bare cell and electrolyte impregnated in the bare cell are encapsulate.

[2] The power storage device as recited in the aforementioned Item [1] can be configured as follow. The first external member includes the first metal foil layer and a first insulation resin film laminated on the other surface of the first metal foil layer. The second external member includes the second metal foil layer and a second insulation resin film laminated on the other surface of the second metal foil layer. At one end portion of the power storage device in a length direction thereof, the first metal foil layer is provided with a first metal foil extended portion extended outward beyond the second metal foil layer in the length direction, so that the first metal foil layer is exposed at one surface or the other surface of the first metal foil extended portion to form a positive electrode terminal. At the other end portion of the power storage device in the length direction, the second metal foil layer is provided with a second metal foil extended portion extended outward beyond the first metal foil layer in the length direction, so that the second metal foil layer is exposed at the one surface or the other surface of the second metal foil extended portion to form a negative electrode terminal.

[3] The power storage device as recited in the aforementioned Item [1] can be configured as follows. a first insulation resin film is laminated on the other surface of the first metal foil layer in a manner as to leave a first metal foil outer exposed portion in which the first metal foil layer is exposed, and wherein a second insulation resin film is laminated on the other surface of the second metal foil layer in a manner as to leave a second metal foil outer exposed portion in which the second metal foil layer is exposed.

[4] The power storage device as recited in any one of the aforementioned Items [1] to [3] can be configured as follows. An inwardly recessed concave portion is formed at a region of at least one of external members among the first external member and the second external member, the region corresponding to the partition sealing portion.

[5] The power storage device as recited in any one of the aforementioned Items [1] to [4] can be configured as follows. The bare cell is structured so as to include a rolled laminated body in which the positive electrode portion, the separator, the negative electrode portion, and the separator are laminated in this order.

[6] A production method of a power storage device, includes the following steps: a step of preparing a first exterior sheet member including a first metal foil layer in which a plurality of mutually independent bare cell accommodation formed concave portions are formed, and a first thermoplastic resin layer laminated at a peripheral edge portion on one surface of the first metal foil layer and a partition region between adjacent bare cell accommodation formed concave portions on one surface of the first metal foil layer; a step of preparing a second exterior sheet member including a flat second metal foil layer and a second thermoplastic resin layer laminated at a region of one surface of the second metal foil layer corresponding to the first thermoplastic resin layer; a step of preparing a plurality of bare cells each including a positive electrode portion in which a positive electrode active material layer is laminated on one surface of a positive electrode side metal foil, a negative electrode portion in which a negative electrode active material layer is laminated on one surface of the negative electrode side metal foil, and a separator arranged between the positive electrode portion and the negative electrode portion; a step of overlapping both the exterior sheet members in a state in which the first exterior sheet member and the second exterior sheet member are arranged with the respective thermoplastic resin layers facing inward and the bare cell is accommodated in a bare cell accommodation formed concave portion of the first exterior sheet member, and heat-sealing the first thermoplastic resin layer of the first exterior sheet member and a second thermoplastic resin layer of the second exterior sheet member to bring the first metal foil layer of the first exterior sheet member and the positive electrode side metal foil of the bare cell into contact with each other to thereby electrically connect them and bring the second metal foil layer of the second exterior sheet member and a negative electrode side metal of the bare cell into contact with each other to thereby electrically connect them.

[7] A production method of a power storage device, includes the following steps: a step of preparing a second exterior sheet member including a second metal foil layer in which a plurality of mutually independent bare cell accommodation formed concave portions are formed and a second thermoplastic resin layer laminated at a peripheral edge portion on one surface of the second metal foil layer and a partition region between adjacent bare cell accommodation formed concave portions on one surface of the second metal foil layer; a step of preparing a first exterior sheet member including a flat first metal foil layer and a first thermoplastic resin layer laminated at a region of one surface of the first metal foil layer corresponding to the second thermoplastic resin layer; a step of preparing a plurality of bare cells each including a positive electrode portion in which a positive electrode active material layer is laminated on one surface of a positive electrode side metal foil, a negative electrode portion in which a negative electrode active material layer is laminated on one surface of the negative electrode side metal foil, and a separator arranged between the positive electrode portion and the negative electrode portion; and a step of overlapping both the exterior sheet members in a state in which the first exterior sheet member and the second exterior sheet member are arranged with the respective thermoplastic resin layers facing inward and the bare cell is accommodated in a bare cell accommodation formed concave portion of the second exterior sheet member, and heat-sealing the first thermoplastic resin layer of the first exterior sheet member and a second thermoplastic resin layer of the second exterior sheet member to bring the first metal foil layer of the first exterior sheet member and the positive electrode side metal foil of the bare cell into contact with each other to thereby electrically connect them and bring the second metal foil layer of the second exterior sheet member and a negative electrode side metal foil of the bare cell into contact with each other to thereby electrically connect them.

[8] A production method of a power storage device, includes the following steps: a step of preparing a first exterior sheet member including a first metal foil layer in which a plurality of mutually independent bare cell accommodation formed concave portions are formed and a first thermoplastic resin layer laminated at a peripheral edge portion on one surface of the first metal foil layer and a partition region between adjacent bare cell accommodation formed concave portions on one surface of the first metal foil layer; a step of preparing a second exterior sheet member including a second metal foil layer in which a plurality of mutually independent bare cell accommodation formed concave portions are formed and a second thermoplastic resin layer laminated at a peripheral edge portion on one surface of the second metal foil layer and a partition region between adjacent bare cell accommodation formed concave portions on one surface of the second metal foil layer; a step of preparing a plurality of bare cells each including a positive electrode portion in which a positive electrode active material layer is laminated on one surface of a positive electrode side metal foil, a negative electrode portion in which a negative electrode active material layer is laminated on one surface of the negative electrode side metal foil, and a separator arranged between the positive electrode portion and the negative electrode portion; a step of overlapping both the exterior sheet members in a state in which the first exterior sheet member and the second exterior sheet member are arranged with the respective thermoplastic resin layers facing inward, a forming concave portion of the first exterior sheet member and a forming concave portion of the second exterior sheet member are arranged so as to face with each other, and the bare cell is accommodated in a bare cell accommodation formed concave portion of both the exterior sheet members, and heat-sealing the first thermoplastic resin layer of the first exterior sheet member and a second thermoplastic resin layer of the second exterior sheet member to bring the first metal foil layer of the first exterior sheet member and the positive electrode side metal foil of the bare cell into contact with each other to thereby electrically connect them and bring the second metal foil layer of the second exterior sheet member and a negative electrode side metal of the bare cell into contact with each other to thereby electrically connect them.

In the embodiment of the present disclosure as recited in the aforementioned Item [1], the internal space of the power storage device is partitioned into a plurality of independent individual spaces by the partition sealing portion, and electrolyte is encapsulated in each individual space. Thus, even if liquid leakage occurs in one individual space, it does not affect the other individual spaces, which results in less damage and less impact to the device performance.

Further, the partition sealing portion is a region in which no bare cell exists, which allows bending or curving of the power storage device at the partition sealing portion. As a result, the power storage device becomes flexible as a whole, resulting in excellent flexibility. The partition sealing portion is a region existing none of the positive electrode active material layer, the negative electrode active material layer, and the electrolyte. Therefore, even if bending operations, curving operations, etc., are performed at the partition sealing portion, no dropping of active material and/or no leakage of electrolyte occurs, and the power storage device is excellent in bending durability. As will be apparent from the above, the partition sealing portion plays a role as a bendable portion of the power storage device.

Due to the existence of the partition sealing portion, it becomes possible to perform bending or curving operations. Even if the thickness of the bare cell accommodated in each individual space increases, the bending performance will not be affected. This makes it possible to increase the thickness of the bare cell, which in turn can realize an increased capacity.

The storage device according to this disclosure allows repeated bending or curving operations and can realize an increased capacity, and therefore can be mounted on a bendable electronic device (for example, a smart phone, a tablet terminal, etc.), and also can be mounted on a belt to be mounted in a bent or curved state, a smart watch to be mounted in a bent or curved state, etc. The power storage device according to the present disclosure can realize an increased capacity, and therefore can extend the continuously usable time of, e.g., a smart phone, a tablet terminal, a smart watch, etc.

In the embodiment of the present disclosure as recited in the aforementioned Item [2], since the insulation resin films are laminated on both sides of the device, sufficient insulation properties can be secured (excluding the metal foil exposed portion), and physical strength can also be secured. Thus, even if bending or curving operations are performed repeatedly, the metal layer causes no metal fatigue. Therefore, it becomes possible to cope with mounting the power storage device on a portion required to have insulation properties.

Further, the first metal foil layer is exposed to one surface or the other surface of the first metal foil extended portion electrically connected to the positive electrode portion to thereby provide a positive electrode terminal. Further, the second metal foil layer is exposed to one surface or the other surface of the second metal foil extended portion electrically connected to the negative electrode portion to thereby provide a negative electrode terminal. Electricity can be transferred via the positive electrode terminal and the negative electrode terminal, and therefore there is a merit of eliminating conventional lead wires. For this reason, the number of parts of the power storage device can be reduced, and it also becomes possible to attain lightweighting.

Further, the positive electrode terminal is provided at one end portion of the power storage device in the length direction, and the negative electrode terminal is provided at the other end portion of the power storage device in the length direction. This sufficiently prevents the short-circuiting of the positive electrode terminal and the negative electrode terminal due to the contact therebetween.

Further, conventional lead wires become unnecessary, which prevents occurrence of the phenomenon that heat generation during charging and discharging of the power storage device intensively occurs around the lead wires. Further, heat generation can be diffused (two-dimensionally) to the entirety of the thin power storage device via the first metallic foil layer electrically connected to the positive electrode portion and the second metal foil layer electrically connected to the negative electrode portion. This enables an extension of the life of the power storage device (that is, a long life power storage device can be provided). Further, since a lead wire becomes unnecessary, the production cost can be reduced by that.

In the embodiment of the present disclosure as recited in the aforementioned Item [3], since the insulation resin films are laminated on both sides of the device, sufficient insulation properties can be secured (excluding the metal foil exposed portion), and physical strength can also be secured. Thus, even if bending or curving operations are performed repeatedly, the metal layer causes no metal fatigue. Therefore, it becomes possible to cope with mounting the power storage device on a portion required to have insulation properties.

Further, the existence of the first metal foil outer exposed portion electrically connected to the positive electrode portion and the second metal foil exposed portion electrically connected to the negative electrode portion enables electric transmission via the outer exposed portions. Therefore, there is an advantage that a conventional lead wire can be eliminated. For this reason, the number of parts of the power storage device can be reduced, and it also becomes possible to attain lightweighting.

Further, a conventional lead wire becomes unnecessary, which prevents a phenomenon that heat generation during charging and discharging of the power storage device intensively occurs around the lead wire. Further, heat generation can be diffused (two-dimensionally) to the entirety of the thin power storage device via the first metallic foil layer electrically connected to the positive electrode portion and the second metal foil layer electrically connected to the negative electrode portion. This enables an extension of the life of the power storage device (that is, a long life power storage device can be obtained). Further, since a lead wire becomes unnecessary, the production cost can be reduced by that.

In the embodiment of the present disclosure as recited in the aforementioned Item [4], an inwardly recessed concave portion is formed at a region of at least one of external members corresponding to the partition sealing portion. Therefore, bending operations such as being or curving can be performed easily, and the bare cell can be encapsulated without forming an unnecessary gap.

In the embodiment of the present disclosure as recited in the aforementioned Item [5], a power storage device further increased in capacity can be provided.

In the embodiment of the present disclosure as recited in the aforementioned Items [6], [7], and [8], it is possible to effectively produce a power storage device according to the embodiment of the present disclosure which is bendable and high in capacity. The partition sealing portion corresponding to a part of the region (periphery sealing portion, partition sealing portion) in which the first thermoplastic resin layer of the first exterior sheet member and the second thermoplastic resin layer of the second exterior sheet member are heat-sealed is a region in which there exists no bare cell (positive electrode active material layer, negative electrode active material layer, electrolyte, etc.). Therefore, even if a bending operation or a curving operation (see FIG. 13) is performed at the partition sealing portion, there occurs no falling off of the positive electrode active material and/or the negative electrode active material or electrolyte leakage.

BRIEF DESCRIPTION OF THE DRAWINGS

Embodiments of the present disclosure are shown by way of example, and not limitation, in the accompanying figures.

FIGS. 9A and 9B show another embodiment of a power storage according to the present disclosure, wherein FIG. 9A is a plan view, and FIG. 9B is a cross-sectional view taken along the line V-V in FIG. 9A.

FIGS. 10A and 10B show still another embodiment of a power storage according to the present disclosure, wherein FIG. 10A is a plan view, and FIG. 10B is a cross-sectional view taken along the line W-W in FIG. 10A.

FIGS. 11A, 11B, 11C and 11D are schematic perspective views showing one example of a production method of a first exterior sheet member, wherein FIG. 11A shows a state in which an adhesive agent is partially being applied to an aluminum foil using a gravure roll, FIG. 11B is a view showing a state in which a non-stretched polypropylene is adhered to an adhesive agent application surface, FIG. 11C shows a state in which the first exterior sheet member is being cut with cutters, and wherein FIG. 11D shows a state in which a region of the polypropylene film layer corresponding to an adhesive agent non-applied region is being sequentially removed with a laser (blade).

FIGS. 12A, 12B and 12C are schematic perspective views showing one example of a production method of a power storage devices.

FIGS. 13A and 13B are schematic side views used to explain a bending processing evaluation method, wherein FIG. 13A shows a state in which a power storage device is bent in a circular manner with the bottom surface (partition sealing portion) of the concave portion facing inward, and FIG. 13B shows a state in which a power storage device is bent in a circular manner with the bottom surface (partition sealing portion) of the concave portion facing outward.

FIGS. 14A and 14B show a power storage device according to Comparative Example 1, wherein FIG. 14A is a plan view, and FIG. 14B is a cross-sectional view taken along the line M-M in FIG. 14A.

EMBODIMENTS FOR CARRYING OUT THE INVENTION

Figure 1:
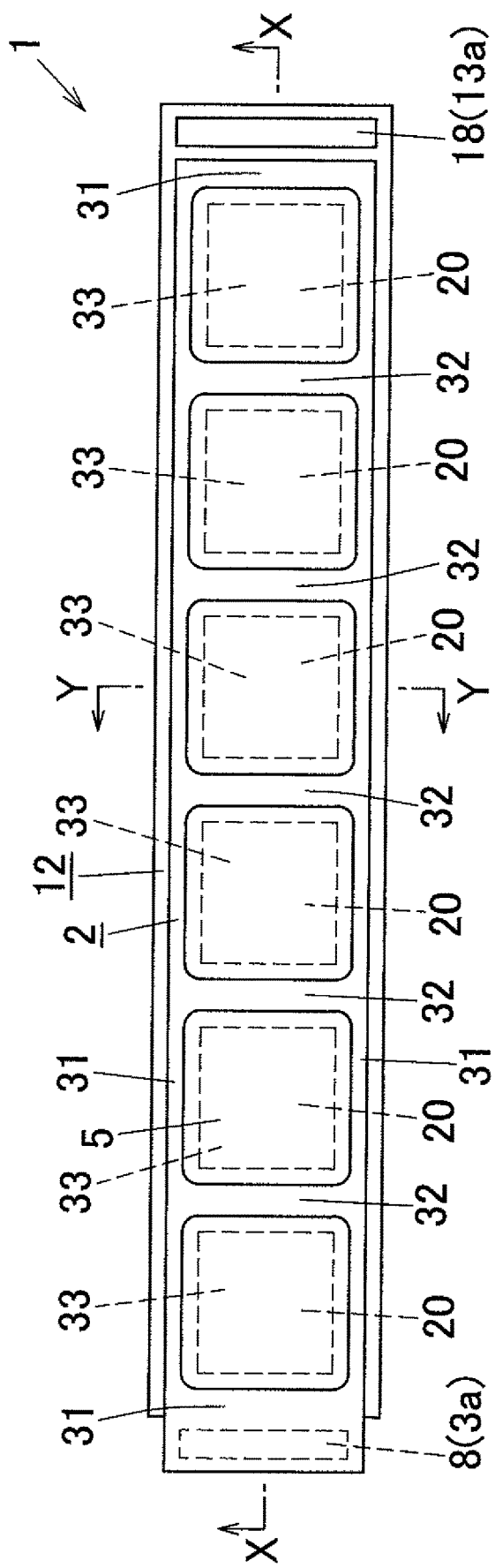
FIG. 1 is a plan view showing an embodiment of a power storage device according to the present disclosure.

In the following paragraphs, some embodiments of the present invention will be described by way of example and not limitation. It should be understood based on this disclosure that various other modifications can be made by those in the art based on these illustrated embodiments.

One embodiment of a power storage device according to this disclosure is shown in FIGS. 1 to 5. This power storage device 1 is provided with a first external member 2, a second external member 12, and a bare cell 20 (see FIGS. 1 to 3). A plurality of bare cells 20 are arranged between the first external member 2 and the second external member 12. That is, the bare cells 20 are respectively arranged in the plurality of independent individual spaces 33 formed between the first external member 2 and the second external member 12 (see FIGS. 1 and 2). The plurality of bare cells 20 are arranged separately in the length direction (see FIG. 1).

The bare cell 20 includes a positive electrode portion 22 in which a positive electrode active material layer 25 is laminated on one surface of a positive electrode side metal foil 23, a negative electrode portion 26 in which a negative electrode active material layer 29 is laminated on one surface of the negative electrode side metal foil 27, and a separator 21 arranged between the positive electrode portion 22 and the negative electrode portion 26. The positive electrode active material layer 25 is arranged between the positive electrode side metal foil 23 and the separator 21, and the negative electrode active material layer 29 is arranged between the negative electrode side metal foil 27 and the separator 21.

Figure 7:
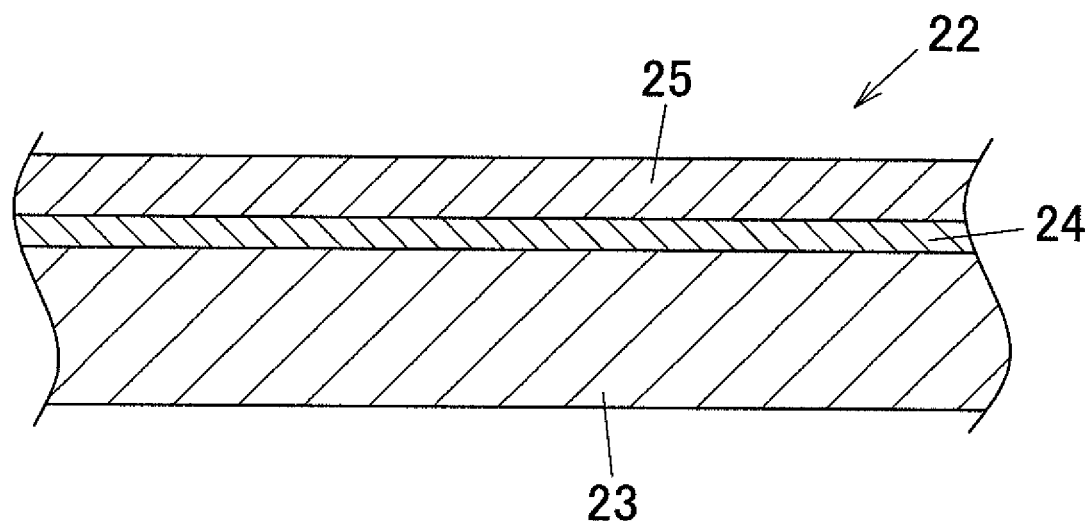
FIG. 7 is a cross-sectional view showing an example of a positive electrode portion.
Figure 8:
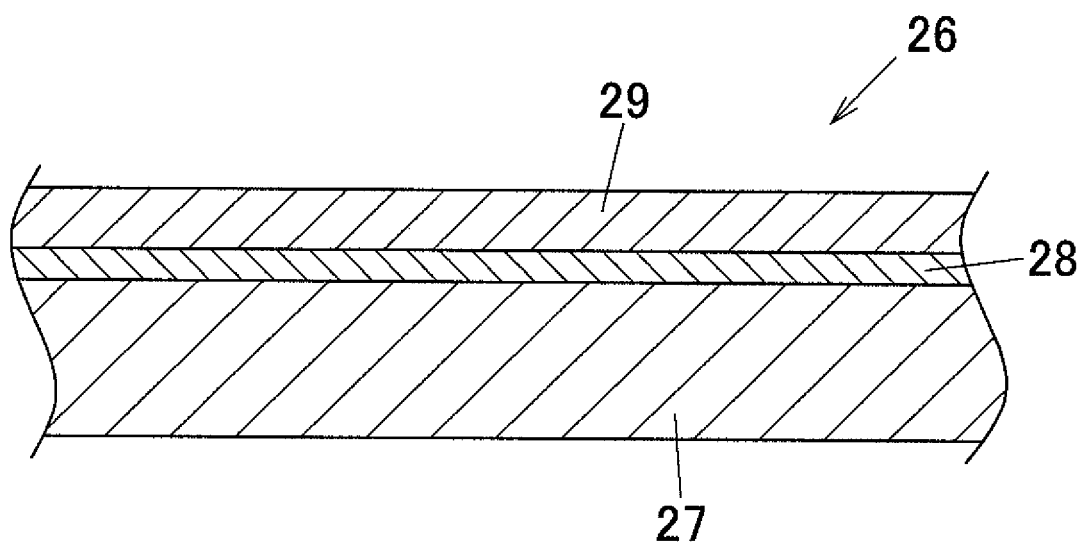
FIG. 8 is a cross-sectional view showing an example of a negative electrode portion.

In this embodiment, as shown in FIG. 7, the positive electrode portion 22 is constituted such that a positive electrode active material layer 25 is laminated on one surface of a positive electrode side metal foil 23 via a binder layer 24. Further, in this embodiment, as shown in FIG. 8, the negative electrode portion 26 is constituted such that a negative electrode active material layer 29 is laminated on one surface of a negative electrode side metal foil 27 via a binder layer 28.

Figure 6:
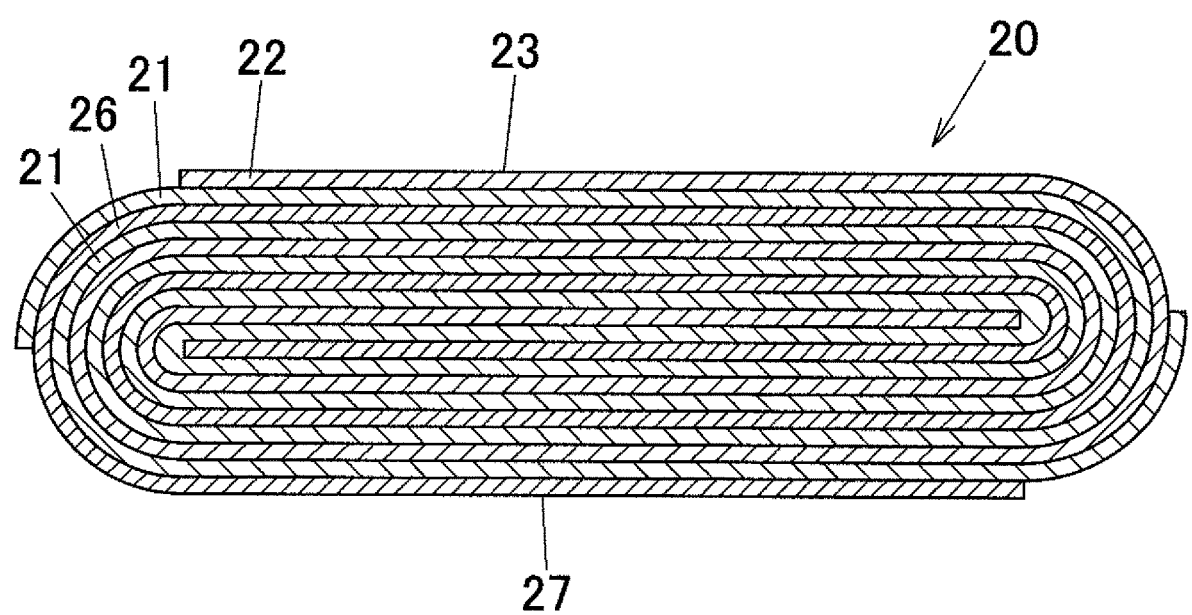
FIG. 6 is an enlarged cross-sectional view showing one embodiment of a bare cell.

In this embodiment, as shown in FIG. 6, the bare cell 20 is structured such that a laminated body in which the positive electrode portion 22, the separator 21, the negative electrode portion 26, and the separator 21 are laminated in this order is rolled. In the bare cell 20 structured by the rolling, it is structured such that the positive electrode side metal foil 23 of the positive electrode portion 22 is exposed on the surface of the first external member 2 side and the negative electrode side metal foil 27 of the negative electrode portion 26 is exposed on the surface of the second external member 12 side (see FIG. 6).

Figure 2:
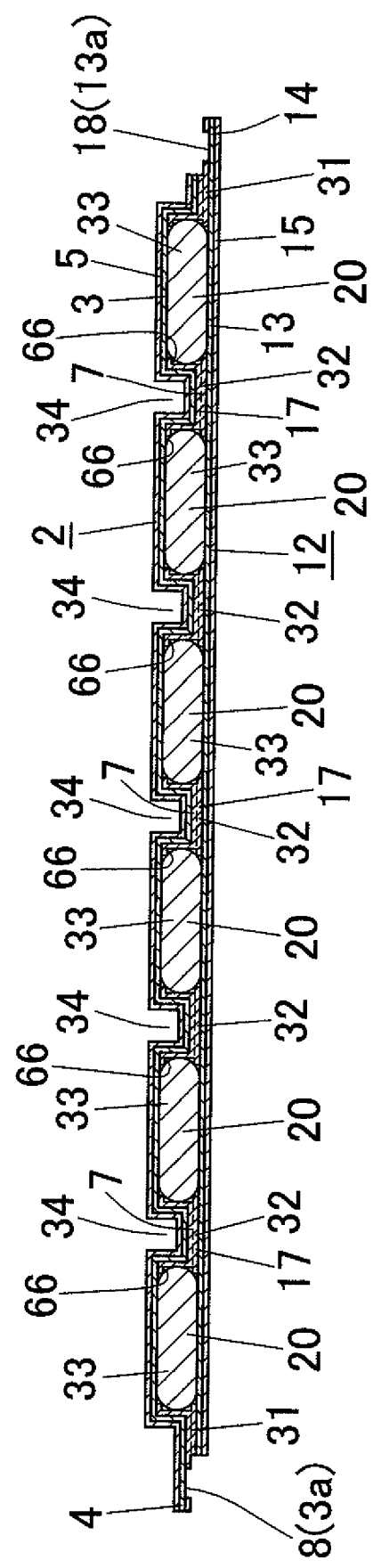
FIG. 2 is a cross-sectional view taken along the line X-X in FIG. 1.
Figure 3:
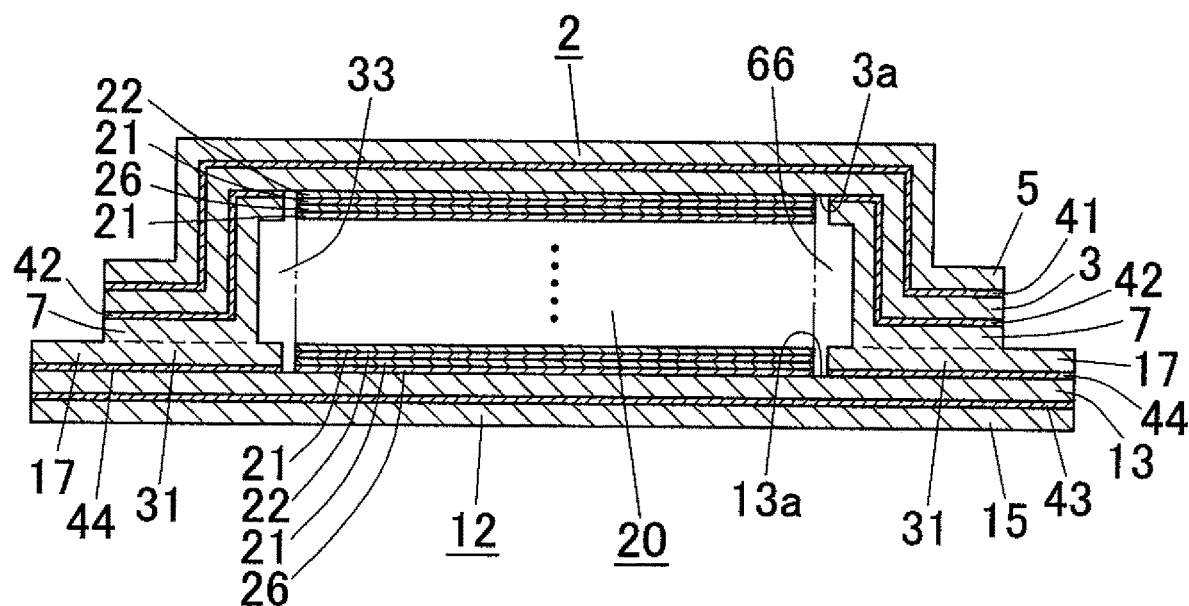
FIG. 3 is a cross-sectional view taken along the line Y-Y in FIG. 1.

As shown in FIGS. 2 and 3, the first external member 2 includes a first metal foil layer 3, and a first insulation resin film 5 laminated on the outer surface (surface opposite to the bare cell side) of the first metal foil layer 3 via a first adhesive agent layer 41. As shown in FIG. 2, in the first external member 2, an inwardly recessed concave portion 34 (recessed toward the second external member 12 side) is formed at a region corresponding to a partition sealing portion 32 and a periphery sealing portion 31 which will be mentioned layer. In other words, the first external member 2 is provided with a bare cell accommodation concave portion 66 expanded (protruded) outward at the region in which the bare cell 20 is arranged. The concave portion 34 and the bare cell accommodation concave portion 66 can be formed, for example, by molding, such as, e.g., hot press forming (e.g., bulging, deep drawing), a planar first external member. The three-dimensional shape of the bare cell accommodation concave portion 66 approximately corresponds to the three-dimensional shape of the bare cell 20. Thus, the bare cell 20 is accommodated in the bare cell accommodation concave portion 66.

As shown in FIGS. 2 and 3, the second external member 12 includes a second metal foil layer 13, and a second insulation resin film 15 laminated on the outer surface (surface opposite to the bare cell side) of the second metal foil layer 13 via a third adhesive agent layer 43. The second external member 12 is not subjected to any forming (no concave portion is formed), and has a planar shape.

As shown in FIGS. 1 to 3, the peripheral edge region of one surface (bare cell 20 side surface) of the first metal foil layer 3 and the peripheral edge region of one surface (bare cell 20 side surface) of the second metal foil layer 13 are joined via a periphery sealing portion 31 containing a thermoplastic resin and sealed.

Figure 4:
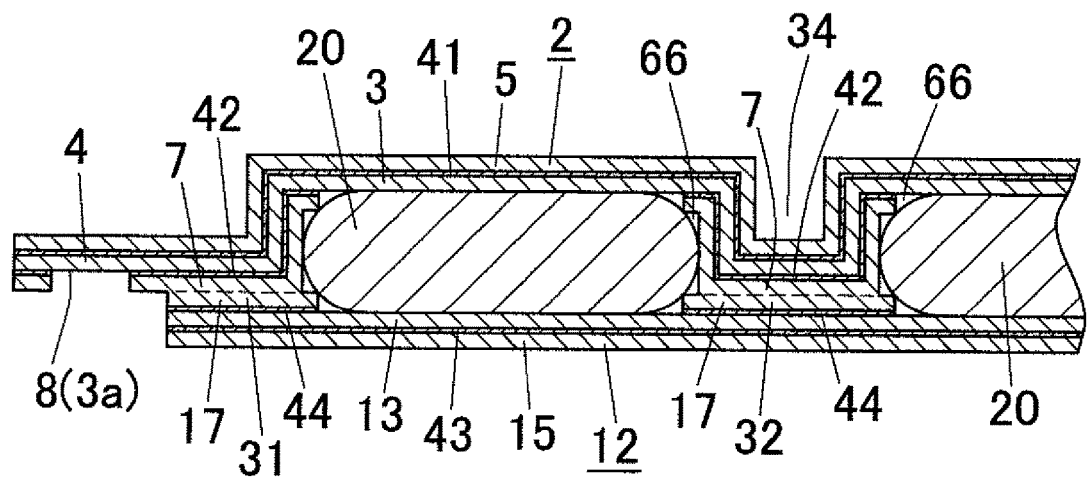
FIG. 4 is an enlarged cross-sectional view of one end portion (left end portion) in the length direction in FIG. 2.
Figure 5:
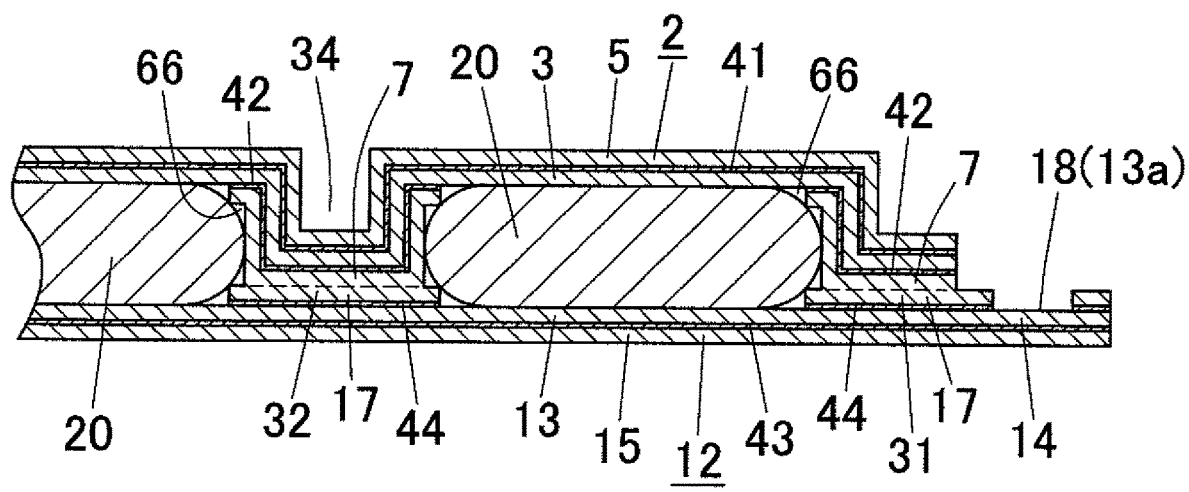
FIG. 5 is an enlarged cross-sectional view of the other end portion (right end portion) in the length direction in FIG. 2.

In this embodiment, as shown in FIGS. 3, 4 and 5, a structure is employed, in which the first thermoplastic resin layer 7 is laminated on the peripheral edge region of one surface (bare cell 20 side surface) of the first metal foil layer 3 via the second adhesive agent layer 42, the second thermoplastic resin layer 17 is laminated on the peripheral edge region of one surface (bare cell 20 side surface) of the second metal foil layer 13 via the fourth adhesive agent layer 44, and the first thermoplastic resin layer 7 and the second thermoplastic resin layer 17 are joined and heat-sealed by thermal fusion to form the periphery sealing portion 31.

As shown in FIG. 2, a plurality of bare cells 20 are arranged between the first external member 2 and the second external member 12, and the portion region of one surface (bare cell 20 side surface) of the first metal foil layer 3 corresponding between adjacent bare cells and the portion region of one surface (bare cell 20 side surface) of the second metal foil layer 13 corresponding between adjacent bare cells 20 are joined and sealed via the partition sealing portion 32 containing a thermoplastic resin.

Thus, as shown in FIGS. 1 and 2, the internal space surrounded by the first metal foil layer 3, the second metal foil layer 13, and the periphery sealing portion 31 is partitioned by the partition sealing portions 32 into a plurality of independent spaces 33. In other words, each individual space 33 is a space surrounded by the first metal foil layer 3, the second metal foil layer 13, the periphery sealing portion 31, and the partition sealing portion 32, and is structured in a liquid-tight manner (see FIGS. 1 to 3). In this embodiment, as shown in FIGS. 1 and 2, the internal space is partitioned into six independent individual spaces 33 by five partition sealing portions 32 arranged in parallel to each other. The number of the individual spaces 33 to be formed is not specifically limited, and it can be configured such that, for example, the inner space is partitioned into two independent individual spaces 33 by a single partition sealing portion 32.

At the region of one surface (bare cell 20 side surface) of the first metal foil layer 3 excluding the periphery sealing portion 31 and the partition sealing portion 32, the first metal foil is exposed, and the portion in which the first metal foil is exposed and the positive electrode portion 22 of the bare cell 20 are in contact with each other and electrically connected. That is, at the region of one surface (bare cell 20 side surface) of the first metal foil layer 3 corresponding to each individual space 33 (bare cell 20), a first metal foil inner exposed portion 3a in which the first metal foil is exposed is provided. In each individual space 33, as shown in FIG. 3, the first metal foil inner exposed portion 3a and the positive electrode side metal foil 23 of the positive electrode portion 22 of the bare cell 20 are in contact with each other, so that the first metal foil layer 3 of the first external member 2 and the positive electrode portion 22 of the bare cell 20 are electrically connected.

At the region of one surface (bare cell 20 side surface) of the second metal foil layer 13 excluding the periphery sealing portion 31 and the partition sealing portion 32, the second metal foil is exposed, and the portion in which the second metal foil is exposed and the negative electrode portion 26 of the bare cell 20 are in contact with each other and electrically connected. That is, at the region of one surface (bare cell 20 side surface) of the second metal foil layer 13 corresponding to each individual space 33 (bare cell 20), a second metal foil inner exposed portion 13a in which the second metal foil is exposed is provided. In each individual space 33, as shown in FIG. 3, the second metal foil inner exposed portion 13a and the negative electrode side metal foil 27 of the negative electrode portion 26 of the bare cell 20 are in contact with each other, so that the second metal foil layer 13 of the second external member 12 and the negative electrode portion 26 of the bare cell 20 are electrically connected.

In each individual space 33, electrolyte impregnated in the bare cell 20 is also encapsulated together with the bare cell 20.

In this embodiment, the following structures are further equipped. That is, at one end portion of the power storage device 1 in a length direction thereof, a first metal foil extended portion 4 in which the first metal foil layer 3 is extended outward of the second metal foil layer 13 in the length direction is provided, a first insulation resin film 5 is laminated on the other surface (surface opposite to the bare cell side surface) of the first metal foil extended portion 4 and the first metal foil layer 3, at the other end portion of the power storage device 1 in a length direction thereof, the second metal foil extended portion 14 in which the second metal foil layer 13 is extended outward of the first metal foil layer 3 in the length direction is provided, and a second insulation resin film 15 is laminated on the other surface (surface opposite to the bare cell side surface) of the second metal foil extended portion 14 and the second metal foil layer 13. Further, no thermoplastic resin layer is laminated on one surface (bare cell 20 side surface) of the first metal foil extended portion 4, so that a positive electrode terminal 8 is constituted by a first metal foil inner exposed portion 3a in which the first metal foil is exposed. Further, no thermoplastic resin layer is laminated on one surface (bare cell 20 side surface) of the second metal foil extended portion 14, so that a negative electrode terminal 18 is constituted by a second metal foil inner exposed portion 13a in which the second metal foil is exposed (see FIGS. 1 and 2).

Further, in this embodiment, as shown in FIG. 1, it is constituted such that the positions of both end faces of the second external member 12 (second thermoplastic resin layer 17) in the width direction are protruded outward of the positions of both side faces of the first external members 2 (first thermoplastic resin layer 7) in the widthwise direction.

In the power storage device 1 structured as mentioned above, even if the inner space is not heat-sealed at the partition sealing portion 32 to allow the electrolyte to freely move between adjacent spaces, the function of the power storage device can be maintained. In the power storage device 1 structured mentioned above, the internal space of the power storage device is partitioned into a plurality of independent individual spaces 33 by the partition sealing portions 32, and electrolyte is encapsulated in each individual space 33. Therefore, even if liquid leakage occurs in one individual space, it does not affect the other individual spaces, which results in less damage and less impact to the device performance.

Further, the partition sealing portion 32 is a region in which no bare cell exists, which allows bending or curving of the power storage device at the partition sealing portion 32. As a result, the power storage device becomes flexible as a whole, resulting in excellent flexibility. At this time, the partition sealing portion 32 is a region in which the positive electrode active material layer, the negative electrode active material layer and the electrolyte do not exist. Therefore, even if bending operations, curving operations, etc., are performed at the partition sealing portion 32, no dropping of active material and/or no leakage of electrolyte occurs. Therefore, the power storage device 1 according to this disclosure can be mounted on a bendable electronic device (e.g., a smart phone, a tablet terminal, etc.), and also can be mounted on a foldable electronic paper, a belt to be worn in a curved or bent manner, a smart watch to be worn in a curved or bent manner, etc.

By the existence of the partition sealing portion 32, the power storage device can be curved or bent. Therefore, even if the thickness of the bare cell 20 to be accommodated in each individual space 33 increases, the bending performance is not affected, which enables to increase the thickness of the bare cell 20. Therefore, the high capacitance can be realized.

Further, in this embodiment, since the insulation resin films 5 and 15 are laminated on both sides of the device, sufficient insulation properties can be secured (except for the metal foil exposed portion), and physical strength can also be secured. Thus, even if bending or curving operations are performed repeatedly, the first metal foil layers 3 and the second metal foil layer 13 cause no metal fatigue. Therefore, it becomes possible to cope with mounting the power storage device on a portion required to have insulation properties.

Further, in this embodiment, the first metal foil layer 3 is exposed at the first metal foil extended portion 4 electrically connected to the positive electrode portion 22 of the bare cell 20 to thereby form a positive electrode terminal 8. The second metal foil layer 13 is exposed at the second metal foil extended portion 14 electrically connected to the negative electrode portion 26 of the bare cell 20 to thereby form a negative electrode terminal 18. Electricity can be transferred via the positive electrode terminal 8 and the negative electrode terminal 18, and therefore there is a merit of eliminating conventional lead wires. For this reason, the number of parts of the power storage device can be reduced, and it is also possible to attain lightweighting.

Further, the positive electrode terminal 8 is provided at one end portion of the power storage device 1 in the length direction, and the negative electrode terminal 18 is provided at the other end portion of the power storage device 1 in the length direction. This sufficiently prevents the short-circuiting of the positive electrode terminal and the negative electrode terminal due to the contact therebetween.

Further, a conventional lead wire becomes unnecessary, which prevents a phenomenon that heat generation during charging and discharging of the power storage device intensively occurs around the lead wire. Further, heat generation can be diffused (two-dimensionally) to the entirety of the thin power storage device 1 via the first metal foil layer 3 electrically connected to the positive electrode portion 22 of the bare cell 20 and the second metal foil layer 13 electrically connected to the negative electrode portion 26 of the bare cell 20. This enables an extension of the life of the power storage device (that is, a long life power storage device can be obtained). Further, since a lead wire becomes unnecessary, the production cost can be reduced by that.

In addition, in this embodiment, as shown in FIG. 1, the positions of both end faces of the second external member 12 (second thermoplastic resin layer 17) in the width direction are protruded outward of the positions of both side faces of the first external members 2 (first thermoplastic resin layer 7) in the widthwise direction. This sufficiently can prevent occurrence of short-circuiting due to the contact of the first metal foil layer 3 and the second metal foil layer 13 at end faces of the widthwise sides of the power storage device 1.

It can be constituted such that the positions of both end faces of the first external member 2 (first thermoplastic resin layer 7) in the width direction are protruded outward of the positions of both side faces of the second external members 12 (second thermoplastic resin layer 17) in the widthwise direction. Also in this case, this sufficiently can prevent occurrence of short-circuiting due to the contact of the first metal foil layer 3 and the second metal foil layer 13 at end faces of the widthwise sides of the power storage device 1.

Further, it can be constituted such that the positions of both end faces of the first external member 2 (first thermoplastic resin layer 7) in the width direction are flush with the positions of both side faces of the second external members 12 (second thermoplastic resin layer 17) in the widthwise direction. However, from the viewpoint of assuredly preventing occurrence of short-circuiting, it is preferable to employ any one of the aforementioned protruded structures.

In this embodiment, a positive electrode terminal 8 is constituted by a first metal foil inner exposed portion 3a on one surface (bare cell 20 side surface) of the first metal foil extended portion 4, but not limited to such embodiment. For example, it can be configured such that no thermoplastic resin layer is laminated on the other surface of the first metal foil extended portion 4, so that a positive electrode terminal 8 is constituted by a first metal foil outer exposed portion 3b in which the first metal foil is exposed (see FIG. 9).

Further, in this embodiment, the negative electrode terminal 18 is constituted by a second metal foil inner exposed portion 13a on one surface (bare cell 20 side surface) of the second metal foil extended portion 14, but not limited to such embodiment. For example, it can be configured such that no second insulation resin film is laminated on the other surface of the second metal foil extended portion 14, so that the negative electrode terminal 18 is constituted by the second metal foil outer exposed portion 13b in which the second metal foil is exposed (see FIG. 9).

Further, in this embodiment, the first external member 2 is provided with a concave portion 34 at the region corresponding to the partition sealing portion 32, and the second external member 12 is not subjected to any forming (no concave portion is formed), and has a planar shape. However, it is not limited to such a structure, and can be configured, for example, such that the concave portion 34 is formed on the second external member 12 and the first external member 2 is not subjected to any forming (no concave portion is formed), and has a planar shape.

Alternatively, as shown in FIG. 10, in both the first external member 2 and the second external member 12, the individual space 33 can be formed by forming a concave portion 34 at the region corresponding to the partition sealing portion 32. In other words, in both the first external member 2 and the second external member 12, the individual space 33 can be formed by forming a bare cell accommodation concave portion 66 protruded outward at the region in which the bare cell 20 is to be arranged. In this structure, a first metal foil inner exposed portion 3a in which the first metal foil layer is exposed is exposed at the bottom surface of the bare cell accommodation concave portion 66 of the first external member 2, the first metal foil inner exposed portion 3a and the positive electrode side metal foil 23 of the bare cell 20 are in contact with each other and electrically connected, the second metal foil inner exposed portion 13a in which the second metal foil layer is exposed is exposed at the bottom surface of the bare cell accommodation concave portion 66 of the second external member 12, and the second metal foil inner exposed portion 13a and the negative electrode side metal foil 27 of the bare cell 20 are in contact with each other and electrically connected.

Further, in the aforementioned embodiment, the structure is employed, in which the first insulation resin film 5 is laminated on the other surface of the first metal foil layer 3, and the second insulation resin film 15 is laminated on the other surface of the second metal foil layer 13 (see FIGS. 1 to 5). However, depending on the intended use, etc., it is possible to employ the structure in which no such insulation resin films 5 and 15 is laminated. That is, it is possible to employ a structure in which an approximately entire surface or the entire surface of the other surface of the first metal foil layer 3 is exposed, and an approximately entire surface or the entire surface of the other surface of the second metal foil layer 13 is exposed.

Further, in the aforementioned embodiment, six individual spaces 33 are provided, but the number of individual spaces is not limited to it. It can be configured to provide two to five individual spaces, or seven or more individual spaces.

Next, one example of a production method of the power storage device 1 according to the present disclosure will be explained. Initially, a first exterior sheet member 61, a second exterior sheet member 62, and bare cells 20 are prepared (see FIGS. 3, 4, 5 and 12).

That is, a first exterior sheet member 61 is prepared, in which a plurality of mutually independent bare cell accommodation formed concave portions 66 is formed in the laminated body in which the first insulation resin film 5 is laminated on one surface of the first metal foil layer 3 via the first adhesive agent layer 41, and the first thermoplastic resin layer 7 is laminated at the peripheral edge portion on one surface of the first metal foil layer 3 and a partition region between adjacent bare cell accommodation formed concave portions 66 on one surface of the first metal foil layer 3 via the second adhesive agent layer 42 (see FIG. 12). At the peripheral edge portion of one end portion of the first exterior sheet member 61 in the length direction, (no first thermoplastic resin layer 7 is laminated) the positive electrode terminal 8 is structured by the first metal foil inner exposed portion 3a in which the first metal foil layer 3 is exposed (see FIG. 12).

The first exterior sheet member 61 having the aforementioned structure can produced as follows. In FIG. 12A, the reference numeral "63" denotes a bulging die (male die), "64" denotes a bulging die (female die), "65" denotes a bulging pressing die 65, and "68" denotes a cutting blade. On the lower surface side of the forming die (male die) 63, pressing portions 63a are formed in a protruded manner. The three-dimensional shape of the pressing portion 63a is a three-dimensional shape corresponding to the bare cell accommodation formed concave portion 66. On the upper surface (overlapping surface) of the forming die (female die), forming concave portions (not illustrated) are formed, and the forming concave portion is a three-dimensional shape corresponding to the bare cell accommodation formed concave portion 66. Further, the pressing die 65 is provided with through-holes 65a penetrated vertically so that the pressing portion 63a can be inserted in the through-hole 65a (see FIG. 12A). A planar sheet body 60 is prepared, in which the first insulation resin film 5 is laminated on one surface of the first metal foil layer 3 via the first adhesive agent layer 41 and the first thermoplastic resin layer 7 is laminated at the "peripheral edge portion" on the other surface of the first metal foil layer 3 and a "partition region between regions in which the bare cell accommodation formed concave portions 66 via the second adhesive agent layer 42 (See FIG. 12A). Next, as shown in FIG. 12A, the pressing die 65 is arranged between the forming female die 64 arranged on the lower side and the forming male die 63 arranged on the upper side. The planar sheet body is inserted in between the forming female die 64 and the pressing die 65. The forming male die 63 is lowered from the upper side to bring the forming male die 63 into contact with the pressing die 65 to thereby press the sheet body 60 with the pressing portion 63a. Thus, bare cell accommodation formed concave portions 66 are formed in the planar sheet body 60 to thereby obtain the first exterior sheet member 61. As for the detail production method of the first exterior sheet member 61, one example is detailed in Example 1 which will be described later.

Further, a planar second exterior sheet member 62 is prepared, in which the second insulation resin film 15 is laminated on one surface of the second metal foil layer 13 via the third adhesive agent layer 43, and the second thermoplastic resin layer 17 is laminated on the "peripheral edge portion" of the other surface of the second metal foil layer 13 and the "region between the bare cell accommodation formed concave portion 66 corresponding the partition region" via the fourth adhesive agent layer 44 at the time of overlapping with the first exterior sheet member 61 (see FIGS. 3, 4, 5, and 12). At the peripheral edge portion of the other end portion of the second exterior sheet member 62 in the length direction, (no second thermoplastic resin layer 17 is laminated) the negative electrode terminal 18 is structured by the second metal foil inner exposed portion 13a in which the second metal foil layer 13 is exposed (see FIG. 12B). As for the detail production method of the second exterior sheet member 62, one example is detailed in Example 1 which will be described later.

Further, the aforementioned bare cell 20 is prepared, in which the positive electrode portion 22, the separator 21, the negative electrode portion 26, and the separator 21 are laminated in this order (see FIGS. 6 and 12). This bare cell 20 is structured such that the positive electrode side metal foil 23 of the positive electrode portion 22 is exposed on the surface of the first exterior sheet member 61 side and the negative electrode side metal foil 27 of the negative electrode portion 26 is exposed on the surface of the second exterior sheet member 62 side (see FIGS. 6 and 12).

As shown in FIG. 12B, the first exterior sheet member 61 and the second exterior sheet member 62 are arranged with their thermoplastic resin layers 7 and 17 facing inward, and the position of the partition region of the first exterior sheet member 61 and the position of the partition region of the second exterior sheet member 62 are aligned (i.e., the position of the thermoplastic resin layer 7 of the first exterior sheet member 61 and the position of the thermoplastic resin layer 17 of the second exterior sheet member 62 are aligned). In this state, the bare cells 20 are each accommodated between the bare cell accommodation formed concave portion 66 of the first exterior sheet member 61 and the second exterior sheet member 62 and both the exterior sheet members 61 and 62 are overlapped. Then, both the exterior sheet members 61 and 62 are sandwiched by and between the upper seal plate (flat plate) 71 and the lower seal plate 72 (having accommodation concave portions 73) and pressed while being heated. Thus, the first thermoplastic resin layer 7 of the first exterior sheet member 61 and the second thermoplastic resin layer 17 of the second exterior sheet member 62 are heat-sealed, to thereby form the periphery sealing portion 31 and the partition sealing portion 32. Through the aforementioned pressing, the first metal foil layer 3 of the first exterior sheet member 61 and the positive electrode side metal foil 23 of the bare cell 20 can be brought into contact with each other and electrically connected, and the second metal foil layer 13 of the second exterior sheet member 62 and the negative electrode side metal foil 27 of the bare cell 20 can be brought into contact with each other and electrically connected. The lower seal plate 72 is provided with an accommodation concave portion 73 capable of accommodating the bare cell accommodation formed concave portion 66 of the first exterior sheet member 61, and is configured to accommodate the bare cell accommodation formed concave portion 66 of the first exterior sheet member 61 and the bare cell 20 in the accommodation concave portion 73 at the time of pressing (see FIG. 12B).

The heat-sealing is performed as follows. First, among the four sides corresponding to the peripheral edge portion of each individual space 33, three sides are sealed in advance. Then, from the remaining non-sealed side (e.g., the upper edge portion in FIG. 12), electrolyte is introduced into each individual space 33 using a liquid injection syringe. Thereafter, the remaining non-sealed side (e.g., the upper edge portion in FIG. 12) is pressed with a pair of hot plates, etc., from above and below. Thus, four sides of the peripheral edge portion of each individual space 33 are sealed to thereby obtain a power storage device 1 according to this disclosure as shown in FIGS. 1 to 5. In this power storage device 1, by the heat-sealing of the first thermoplastic resin layer 7 and the second thermoplastic resin layer 17, the periphery sealing portion 31 and the partition sealing portion 32 are formed, and a plurality of individual spaces 33 are partitioned in a liquid-tight manner (see FIGS. 1 and 2). Further, in the obtained power storage device 1, at one end portion of the device in the length direction, a positive electrode terminal 8 is formed by the first metal foil inner exposed portion 3a, and at the other end portion of the device in the length direction, a negative electrode terminal 18 is formed by the second metal foil inner exposed portion 13a at the other end portion of the device in the length direction (see FIGS. 1 and 2).

The aforementioned production method is a mere one example, and the preset disclosure is not limited to the production method.

In this disclosure, the positive electrode side metal foil 23 forming the positive electrode portion 22 of the bare cell 20 is not specifically limited, but an aluminum foil having a thickness of 7 μm to 50 μm can be preferably used.

The positive electrode active material layer 25 forming the positive electrode portion 22 is not specifically limited, but can be formed by a mixed composition, etc., in which, for example, salts (such as, e.g., lithium cobalt oxide, lithium nickel oxide, lithium iron phosphate, and lithium manganese oxide) is added to a binder, such as, e.g., PVDF (polyvinylidene fluoride), SBR (styrene butadiene rubber), CMC (carboxymethyl cellulose sodium salt, etc.), and PAN (polyacrylonitrile). The mixed composition is preferably used for a lithium ion secondary battery, etc. In the electric double layer capacitor, etc., it is preferred to use a carbon-based activated carbon as the positive electrode active material. The thickness of the positive electrode active material layer 25 is preferably set to 2 μm to 300 μm. The positive electrode active material layer 25 may further includes a conductive adjuvant, such as, e.g., a carbon fiber, a carbon black, and a CNT (carbon nanotube).

It is preferable that the binder layer 24 is provided between the positive electrode side metal foil 23 and the positive electrode active material layer 25 for the purpose of improving the adhesiveness therebetween. The binder layer 24 is not specifically limited, but a layer formed by PVDF, SBR, CMC, PAN, etc., can be exemplified.

The binder layer 24 may further includes a conductive adjuvant, such as, e.g., a carbon black, and a CNT (carbon nanotube), to improve the electrical conductivity between the positive electrode side metal foil 23 and the positive electrode active material layer 25.

The thickness of the binder layer 24 is preferably set to 0.2 μm to 10 μm. By setting to 10 μm or less, it becomes possible to prevent that the binder layer itself increases the internal resistance of the power storage device 1.

In this disclosure, the negative electrode side metal foil 27 forming the negative electrode portion 26 of the bare cell 20 is not specifically limited, but a copper foil having a thickness of 7 μm to 50 μm can be preferably used. Other than this, for example, an aluminum foil, a titanium foil, a stainless steel foil, etc., can also be used.

The negative electrode active material layer 29 forming the negative electrode portion 26 is not specifically limited, but can be formed by, for example, a mixed composition in which an additive substance (e.g., graphite, lithium titanium oxide, Si based alloy, tin-based alloys, etc.) is added to a binder, such as, e.g., PVDF, SBR, CMC, and PAN. The thickness of the negative electrode active material layer 29 is preferably set to 1 μm to 300 μm. The negative electrode active material layer 29 may further include a conductive adjuvant, such as, e.g., a carbon black, and a CNT (carbon nanotube).

It is preferable that the binder layer 28 is provided between the negative electrode side metal foil 27 and the negative electrode active material layer 29 for the purpose of improving the adhesiveness therebetween. The binder layer

28 is not specifically limited, but a layer formed by PVDF, SBR, CMC, PAN, etc., can be exemplified.

The binder layer 28 may further include a conductive adjuvant, such as, e.g., a carbon black, and a CNT (carbon nanotube), to improve the electrical conductivity between the negative electrode side metal foil 27 and the negative electrode active material layer 29.

The thickness of the binder layer 28 is preferably set to 0.2 µm to 10 µm. By setting to 10 µm or less, it becomes possible to prevent that the binder layer itself increases the internal resistance of the power storage device 1. The thickness of the binder layer 28 is preferably set to 0.2 µm to 10 µm. By setting it to 10 µm or less, the binder itself can suppress the internal resistance of the power storage device 1 from increasing.

In the present disclosure, the separator 21 constituting the bare cell 20 is not especially limited, but for example, a polyethylene separator, a polypropylene separator, a separator formed by a multi-layer film made of a polyethylene film and a polypropylene film, a separator constituted by a wet or dry porous film to which a heat resistant inorganic material, such as, e.g., ceramics, is applied to any of the above, can be exemplified.

The thickness of the separator 21 is preferably set to 5 µm to 50 µm.

The electrolytes encapsulated in the individual spaces 33 with the bare cells 20 are not especially limited, but a mixed nonaqueous electrolyte including at least two types of electrolytes selected from the group consisting of ethylene carbonate, propylene carbonate, dimethyl carbonate, ethyl methyl carbonate, diethyl carbonate, and dimethoxyethane, and a lithium salt are preferably used. The lithium salt is not especially limited, but for example, lithium hexafluorophosphate, lithium tetrafluoroborate, etc., can be exemplified. As the electrolyte, a gel of the mixed nonaqueous electrolyte with PVDF, PEO (polyethylene oxide), etc., can be used. Since the electrolyte is encapsulated in a sealed state in the individual space 33 (see FIGS. 2 to 5), leaking of electrolytes can be prevented.

The thickness of the bare cell 20 is preferably set to 0.05 mm to 10 mm in consideration of the balance for both the thinness and obtaining a sufficient battery capacity.

Next, a suitable configuration of the bare cell 20 of the power storage device 1 of the present disclosure when the power storage device is used as an electrical double-layer capacitor will be explained, by it is merely an explanation of a suitable configuration and it is not limited to these exemplified configurations.

That is, when using it as an electrical double-layer capacitor, it is preferable that the positive electrode side metal foil layer 23 and the negative electrode side metal foil 27 are formed by a hard aluminum foil having a thickness of 7 µm to 50 µm.

The positive electrode active material layer 25 and the negative electrode active material layer 29 are not especially limited, but it is preferable that both of these layers have a structure including a conductive agent, such as, e.g., a carbon black and a CNT (carbon nanotube).

The separator 21 is not especially limited, but a porous poly cellulose film having a thickness of 5 µm to 100 µm, a nonwoven fabric having a thickness of 5 µm to 100 µm, etc., can be suitably used.

The electrolyte is not especially limited, but an electrolyte including at least one type of organic solvent selected form a group consisting of water, ethylene carbonate, propylene carbonate, dimethyl carbonate, ethyl methyl carbonate, and acetonitrile, and at least one type of salt selected from the group consisting of lithium hexafluorophosphate, lithium tetrafluoroborate, and quaternary ammonium tetrafluoroborate is preferably used. As the quaternary ammonium salt, for example, a tetramethylammonium salt can be exemplified.

The above was an explanation of the suitable structure of the bare cell 20 of the power storage device of the present disclosure used as an electrical double-layer capacitor. The following is a description including all uses other than an electrical double-layer capacitor.

In the present disclosure, the first metal foil layer 3 is not especially limited but preferably formed by a soft aluminum foil. The thickness of the first metal foil layer 3 is preferably set to 20 µm to 150 µm. Above all, in consideration of formability and cost, it is preferable that the first metal foil layer 3 is preferably formed by a soft aluminum foil having a thickness of 30 µm to 80 µm.

In the present disclosure, the second metal foil layer 13 is not especially limited, but it is preferably formed by aluminum foil (hard aluminum foil, soft aluminum foil), copper foil, stainless steel foil, nickel foil, or titanium foil). The thickness of the second metal foil layer 13 is preferably set to 10 µm to 150 µm. Above all, in consideration of shock resistance, bendability, and cost, the thickness of the second metal foil layer 13 is especially preferably set to 15 µm to 100 µm.

The first insulation resin film 5 and the second insulation resin film 15 are not especially limited, but it is preferable to use an oriented polyamide film (oriented nylon film, etc.) or an oriented polyester film. Above all, it is especially preferable to use a biaxially oriented polyamide film (biaxially oriented nylon film, etc.), a biaxially oriented polybutylene terephthalate (PBT) film, a biaxially oriented polyethylene terephthalate (PET) film, or a biaxially oriented polyethylene naphthalate (PEN) film. A nylon film is not especially limited, but for example, 6-nylon film, 6,6 nylon film, and a MX nylon film, can be exemplified. The first insulation resin film 5 and the second insulation resin film 15 can be formed by a single layer, or can be formed by a multi-layer constituted by, for example, an oriented polyester film/an oriented polyamide film (e.g., a multi-layer made by an oriented PET film/an oriented nylon film).

The thickness of the first insulation resin film 5 and the thickness of the second insulation resin film 15 are each preferably set to 9 µm to 50 µm.

When providing the first adhesive agent layer 41 and the third adhesive agent layer 43, these adhesive agents 41 and 43 are not especially limited, but at least one type of an adhesive agent (two-part curing type adhesive agent is preferred) selected from the group consisting of polyester polyurethane-based adhesive agent and polyether polyurethane-based adhesive agent is preferable. The application amount (dry state) of the first adhesive agent layer 41 and the application amount (dry state) of the third adhesive agent layer 43 are preferably set to 1 $g/m^2$ to 5 $g/m^2$.

In the aforementioned embodiment, the periphery sealing portion (periphery sealing portion including thermoplastic resin) 31 is formed by laminating and welding the first thermoplastic resin layer 7 laminated on a peripheral edge portion of one of the surfaces of the first metal foil layer 3 and the second thermoplastic resin layer 17 laminated on a peripheral edge portion of the other surface of the second metal foil layer 13 by heating (see FIGS. 2 to 5). Further, in the aforementioned embodiment, the partition sealing portion (partition sealing portion including thermoplastic resin)

32 is formed by laminating and welding the first thermoplastic resin layer 7 laminated on a partition region (corresponding to a region between adjacent bare cells) of one of the surfaces of the first metal foil layer 3 and the second thermoplastic resin layer 17 laminated on a partition region (corresponding to a region between adjacent bare cells) of the other surface of the second metal foil layer 13 by heating (see FIGS. 2, 4, 5). The first thermoplastic resin layer 7 is preferably formed by a thermoplastic resin nonoriented film. Further, the second thermoplastic resin layer 17 is preferably formed by a thermoplastic resin nonoriented film.

The thermoplastic resin nonoriented film 7 and 17 are not especially limited, but they are constituted by an nonoriented film made of at least one type of thermoplastic resins selected from the group consisting of polyethylene, polypropylene, olefin-based copolymer, acid denaturation thereof and ionomer.

The thickness of the thermoplastic resin nonoriented film 7 and 17 is preferably set to 15 μm to 150 μm. Above all, in total consideration of insulation, bendability, cost, etc., the thickness of the thermoplastic resin nonoriented film 7 and 17 is preferably set to 20 μm to 80 μm.

The second adhesive agent layer 42 is not especially limited, but it is preferable to be a layer formed by a two-part curing type polyolefin-based adhesive agent. When using a two-part curing type polyolefin-based adhesive agent, the decrease in the adherence can be sufficiently prevented with the swelling of the electrolytes. The application amount (dry state) of the second adhesive agent layer 42 is preferably set to 1 g/m$^2$ to 5 g/m$^2$.

The fourth adhesive agent layer 44 is not especially limited, but it is preferable to be a layer formed by a two-part curing type polyolefin-based adhesive agent. When using a two-part curing type polyolefin-based adhesive agent, the decrease in the adherence can be sufficiently prevented with the swelling of the electrolytes. The application amount (dry state) of the fourth adhesive agent layer 44 is preferably set to 1 g/m$^2$ to 5 g/m$^2$.

In the present disclosure, it is preferable that a chemical conversion film is formed on the surface of the first metal foil layer 3 on which at least the first thermoplastic resin layer 7 is laminated (surface of the side in which the bare cell 20 is arranged). Further, similarly, it is preferable that a chemical conversion film is formed on the surface of the second metal foil layer 13 on which at least the second thermoplastic resin layer 17 is laminated (surface of the side in which the bare cell 20 is arranged). The chemical conversion film is a film formed by subjecting the surface of a metal foil to a chemical conversion treatment, and with such a chemical conversion treatment, the corrosion of the surface of the metal foil from contents (electrolyte, etc.) can be sufficiently prevented. For example, by performing the process such as the following, the metal foil is subjected to a chemical conversion treatment. That is, to perform the chemical conversion treatment, on the surface of a metal foil that has been subjected to a degreasing treatment, any one of the following 1) to 3) aqueous solutions is applied to the surface of the metal foil and dried:

1) an aqueous solution made of a mixture of phosphoric acid, chromic acid, and at least one type of compound selected from the group consisting of fluoride metallic salt and fluoride non-metallic salt;
2) an aqueous solution made of a mixture of phosphoric acid, at least one type of resin selected from the group consisting of acrylic resin, chitosan derivative resin and phenol resin, and at least one type of compound selected from the group consisting of chromic acid and chrome (III) salt; and
3) an aqueous solution made of a mixture of phosphoric acid, at least one type of resin selected from the group consisting of acrylic resin, chitosan derivative resin, and phenol resin, at least one type of compound selected from the group consisting of chromic acid and chromium (III) salt, and at least one type of compound selected from the group consisting of fluoride metallic salt and fluoride non-metallic salt.

In the chemical conversion film, the adhesion amount of chromium (per one surface) is preferably 0.1 mg/m$^2$ to 50 mg/m$^2$, and 2 mg/m$^2$ to 20 mg/m$^2$ is especially preferable.

It is preferable that the width of the periphery sealing portion 31 is set to 0.5 mm or larger. Above all, considering the sealing function and for saving space, it is especially preferable that the width of the periphery sealing portion 31 is set to 1 mm to 10 mm.

It is preferable that the width of the partition sealing portion 32 is set to 1 mm or larger. By setting it to 1 mm or larger, bending mobility can be applied to the power storage device 1 as a whole. Above all, considering the sealing function and for saving space, it is especially preferable that the width of the partition sealing portion 32 is set to 2 mm to 10 mm.

In the power storage device 1 of the present disclosure, normally, the thickness at the part with the maximum thickness where the bare cell 20 is accommodated is set to 0.05 mm to 10 mm. Above all, in the power storage device 1 of the present disclosure, it is preferable that the thickness at the part with the maximum thickness where the bare cell 20 is accommodated is set to 0.5 mm to 5 mm.

EXAMPLES

Next, specific examples of the present disclosure will be explained, but it should be noted that the present disclosure is not specifically limited to these Examples.

Example 1

Producing the First Exterior Sheet Member 61

On one of the surfaces of an aluminum foil (A8079 classified with JIS H4160) in which both of its surfaces were chemical conversion treated and having a thickness of 40 μm, a biaxially oriented polyamide film 5 having a thickness of 25 μm was pasted via a two-part curing type polyester polyurethane adhesive agent 41 having an application thickness of 3 μm applied using a dry laminating method, and it was left for 3 days in an aging furnace at 50° C. Next, on the other surface of the aluminum foil 3 (a surface on the opposite side of the polyamide film 5), using a gravure roll 81 which was engraved so that the adhesive agent was not applied for 30 mm×30 mm (squares of 30 mm×30 mm) at an interval of 50 mm pitches (so that the interval between adjacent adhesive agent non-applied region 85 was 20 mm), a two-part curing type polyolefin-based adhesive agent 42 having an application thickness of 2 μm (adhesive agent applied region 84) was applied (see FIG. 11A), and a nonoriented polypropylene film 7 having a thickness of 40 μm was pasted via the adhesive agent 42 (see FIG. 11B) and it was left for 3 days in an aging furnace at 40° C.

After leaving it and cutting it into 50 mm widths by a rotary cutter 86 (see FIG. 11C), the circumference (periphery) of the region corresponding to the adhesive agent non-applied region 85 in the polypropylene film layer 7 was sequentially cut and removed with a laser beam (laser cutter) 87 (see FIG. 11D) to expose the aluminum foil 3 in the region corresponding to the adhesive agent non-applied region 85 to obtain a flat sheet body 60.

Next, as shown in FIG. 12A, a pressing die 65 was arranged between a forming female die 64 arranged on the lower side and a forming male die 63 arranged on the upper side, and by inserting the flat sheet body 60 between the forming female die 64 and the pressing die 65 with the nonoriented polypropylene film 7 side facing the upper surface side, and by lowering the forming male die 63 from the upper side to bring the forming male die 63 in contact with the pressing die 65 to press the flat sheet body 60 with the pressing portion 63a, bulging was performed, and a bare cell accommodation formed concave portion 66 having a length of 40 mm, a width of 40 mm and a depth of 4 mm was formed on the flat sheet body 60 and a first exterior sheet member 61 was obtained (see FIG. 12A). In addition, on the bottom surface of the bare cell accommodation formed concave portion 66, the aluminum foil 3 was exposed.

(Producing the Second Exterior Sheet Member 62)

On one of the surfaces of a stainless steel foil (SUS304) 13 in which both of its surfaces were chemical conversion treated and having a thickness of 20 µm, a biaxially oriented polyester film 15 having a thickness of 12 µm was pasted via a two-part curing type polyester polyurethane adhesive agent 43 having an application thickness of 3 µm applied using a dry laminating method, and it was left for 3 days in an aging furnace at 50° C. Next, on the other surface of the stainless steel foil 13 (a surface on the opposite side of the polyester film 5), using a gravure roll 81 which was engraved so that the adhesive agent was not applied for 30 mm×30 mm (squares of 30 mm×30 mm) at an interval of 50 mm pitches (so that the interval between adjacent adhesive agent non-applied region was 20 mm), a two-part curing type polyolefin-based adhesive agent 44 having an application thickness of 2 µm was applied, and a nonoriented polypropylene film 17 having a thickness of 40 µm was pasted via the adhesive agent 44 and it was left for 3 days in an aging furnace at 40° C.

After leaving it and cutting it into 50 mm widths by a rotary cutter, the circumference (periphery) of the region corresponding to the adhesive agent non-applied region 85 in the polypropylene film layer 17 was sequentially cut and removed with a laser beam (laser cutter) 87 to expose the stainless steel foil 13 in the region corresponding to the adhesive agent non-applied region 85 to obtain a flat second exterior sheet member 62.

(Producing the Bare Cell 20)

On one of the surfaces of a hard aluminum foil 23 having a width of 500 mm and a thickness of 15 µm (a hard aluminum foil A1100 classified with JIS H4160), a binder liquid in which PVDF (polyvinylidene fluoride) as a binder was dissolved in a solvent (dimethylformamide) was applied and dried for 30 seconds at 100° C. to form a binder layer 24 having a thickness of 0.5 µm after drying. Next, a paste made by dispersing and kneading 60 mass parts of positive electrode active material made of lithium cobalt oxide, 10 mass parts of PVDF (polyvinylidene fluoride) as a binder and electrolyte retaining agent, 5 mass parts of acetylene black (conductive material), and 25 mass parts of N-methyl-2-pyrrolidone (NMP) (organic solvent) was applied to the surface of the binder layer 24, and by drying it for 30 minutes under 100° C. and then performing hot pressing, a positive electrode active material layer 25 having a thickness of 120 µm after drying and a density of 4.8 g/cm$^3$ was formed and by cutting it into 35 mm widths, the positive electrode portion 22 as shown in FIG. 7 was obtained.

Next, on one of the surfaces of a hard copper foil 27 having a width of 500 mm and thickness of 15 µm (a hard copper foil C1100R classified with JIS H3100), a binder liquid in which PVDF (polyvinylidene fluoride) as a binder was dissolved in a solvent (dimethylformamide) was applied and dried for 30 seconds at 100° C. to form a binder layer 28 having a thickness of 0.5 µm after drying. Next, a paste made by dispersing and kneading 57 mass parts of negative electrode active material made of carbon powder, 5 mass parts of PVDF as a binder and electrolyte retaining agent, 10 mass parts of the copolymer of hexafluoropropylene and maleic anhydride, 3 mass parts of acetylene black (conductive material), and 25 mass parts of N-methyl-2-pyrrolidone (NMP) (organic solvent) was applied to the surface of the binder layer 28, and by drying it for 30 minutes under 100° C. and then performing hot pressing, a negative electrode active material layer 29 having a thickness of 20.1 µm after drying and a density of 1.5 g/cm$^3$ was formed and by cutting it into 35 mm widths, the negative electrode portion 26 as shown in FIG. 8 was obtained.

Next, a porous separator 21 made by wet process having a width of 38 mm and a thickness of 8 µm was prepared, and a laminated body in which the end portions of a negative electrode portion 26 (the negative electrode active material layer side was arranged on the separator a side)/separator (a)21/positive electrode portion 22 (the positive electrode active material layer side was arranged on the separator b side)/separator (b)21 in the length direction were displaced in that order and laminated was wound so that as shown in FIG. 6, the positive electrode side metal foil (hard aluminum foil) 23 of the positive electrode portion 22 was exposed on the upper surface (surface of the first external member 2 side) and the negative electrode side metal foil (hard copper foil) 27 of the negative electrode portion 26 was exposed on the lower side (surface of the second external member 12 side) to form 6 bare cells 20 of 38 mm×38 mm (squares of 38 mm×38 mm in planar view) having a thickness of 4 mm.

(Producing the Power Storage Device 1)

Next, as shown in FIG. 12A, bare cells 20 were arranged in each of the bare cell accommodation formed concave portions 66 of the first exterior sheet member 61. At this time, the positive electrode side metal foil 23 of the bare cell 20 was arranged so as to be in contact with the first metal foil layer (aluminum foil layer) 3 exposed on the bottom surface of the bare cell accommodation formed concave portion 66 of the first exterior sheet member 61. Then, as shown in FIG. 12A, at a position in which the first metal foil inner exposed portion 3a which was not molded remains on one of the end portions in the length direction, it was cut with a cutting blade 68.

Next, as shown in FIG. 12B, on the top surface of the first exterior sheet member 61 in which the bare cells 20 were accommodated in each of the bare cell accommodation formed concave portions 66, the flat second exterior sheet members 62 were laminated with the nonoriented polypropylene film layer (second thermoplastic resin layer) 17 facing the inside. At this time, it was arranged so that the unmolded first metal foil inner exposed portion 3a in the first exterior sheet member 61 was not laminated against the flat second exterior sheet member 62 and the unmolded second metal foil inner exposed portion 13a in the second exterior sheet member 62 was not laminated against the first exterior sheet member 61 (see FIG. 12B). Further, it was arranged so that the first metal foil inner exposed portion 3a in the first exterior sheet member 61 was positioned at one of the end portions in the length direction and the second metal foil inner exposed portion 13a in the second exterior sheet member 62 was positioned at the other end portion in the length direction (see FIG. 12B). Next, by sandwiching with an upper seal plate 71 and a lower seal plate 72 heated to 200° C. and hot pressing for 3 seconds with a pressure of 0.3 Mpa (see FIG. 12C), the first thermoplastic resin layer 7 of the first exterior sheet member 61 and the second thermoplastic resin layer 17 of the second exterior sheet member 62 were heat sealed and joined to form the periphery sealing portion 31 and the partition sealing portion 32. With the aforementioned pinching, the first metal foil layer (aluminum foil) 3 of the first exterior sheet member 61 and the positive electrode side metal foil (aluminum foil) 23 of the bare cell 20 can be in contact and electrically connected, and the second metal foil layer (stainless steel foil) 13 of the second exterior sheet member 62 and the negative electrode side metal foil (copper foil) 27 of the bare cell 20 can be in contact and electrically connected.

A temporary sealing was performed by performing the heat seal joining first for three of the four sides corresponding to the peripheral edge portions of each of the individual spaces 33. That is, in FIG. 12, the part corresponding to the side on the upper side was not yet sealed and was open.

Next, 5 mL of an electrolyte in which lithium hexafluorophosphate ($LiPF_6$) was dissolved at a density of 1 mol/L in a mixed solvent in which ethylene carbonate (EC), dimethylcarbonate (DMC), ethyl methyl carbonate (EMC) were blended in equal volume ratio was injected into each individual space 33 from the unsealed parts using injection syringes Then, charging was performed until 4.2 V of battery voltage was generated between the positive electrode terminal 8 on one end side in the length direction (first metal foil inner exposed portion 3a) and the negative electrode terminal 18 on the other end side in the length direction (second metal foil inner exposed portion 13a), and after gas was generated from the electrodes, separator, etc., and under 3.0 V electric discharge condition and decompressed state at 0.086 MPa, by pinching the remaining one side of the unsealed portion from top and bottom with a pair of heat plates at 200° C. at a pressure of 0.3 MPa and performing heat sealing for 3 seconds, it was completely sealed and joined and a battery (power storage device) 1 having a structure as shown in FIGS. 1 to 5 and a battery capacity of 3500 mAh was obtained.

Example 2

As the second metal foil layer 13 of the second exterior sheet member 62, other than that an electrolytic copper foil having a thickness of 20 μm was used in place of the stainless steel foil (SUS304) having a thickness of 20 μm, the battery (power storage device) 1 having the structure as shown in FIGS. 1 to 5 and a battery capacity of 3500 mAh was obtained in the same manner as Example 1.

Comparative Example 1

Producing the First Laminate External Member 161

On one of the surfaces of an aluminum foil 103 having a thickness of 40 μm in which both of its surfaces were chemical conversion treated (A8021 soft aluminum foil classified with JIS H4160), a biaxially oriented polyamide film 105 having a thickness of 25 μm was pasted via 3 g/m² of an application amount of a two-part curing type polyester polyurethane adhesive agent applied using a dry laminating method, and on the other surface of the aluminum foil 103 (the surface on the opposite side of the polyamide film 105), a nonoriented polypropylene film 107 having a thickness of 40 μm was pasted via 2 g/m² of an application amount of a two-part curing type polyolefin-based adhesive agent applied using a dry laminating method, and after it was left for 3 days in an aging furnace at 40° C., both end portions in the width direction was cut to obtain the first laminate external member 161 having a width of 50 mm.

(Producing the Second Laminate External Member 162)

On one of the surfaces of a stainless steel foil (SUS304) 113 having a thickness of 20 μm in which both of its surfaces were chemical conversion treated, a biaxially oriented polyester film 115 having a thickness of 12 μm was pasted via 3 g/m² of an application amount of a two-part curing type polyester polyurethane adhesive agent applied using a dry laminating method, and on the other surface of the stainless steel foil 113 (the surface on the opposite side of the polyester film 115), a nonoriented polypropylene film 117 having a thickness of 40 μm was pasted via 2 g/m² of an application amount of a two-part curing type polyolefin-based adhesive agent, and after it was left for 3 days in an aging furnace at 40° C., both end portions in the width direction was cut to obtain the second laminate external member 162 having a width of 50 mm.

(Producing the Positive Electrode Tab Lead 200)

On both surfaces of a soft aluminum foil (A1050 soft aluminum foil classified with JIS H4000) 201 having a length of 30 mm, a width of 3 mm, and a thickness of 100 μm, along one end of the aluminum foil in the length direction (tip) to further 5 mm inward from a position inward in the length direction, an insulation film 202 made by a maleic anhydride-modified polypropylene film (melting point at 140° C., MFR was 3.0 g/10 min) having a length of 10 mm, a width of 5 mm, and a thickness of 50 μm was clamped by heat sealing to obtain the positive electrode tab lead 200.

(Producing the Negative Electrode Tab Lead 210)

On both surfaces of a nickel foil 211 having a length of 40 mm, a width of 3 mm, and a thickness of 100 μm, along one end of the nickel foil in the length direction (tip) to further 5 mm inward from a position inward in the length direction, an insulation film 212 made by a maleic anhydride-modified polypropylene film (melting point at 140° C., MFR was 3.0 g/10 min) having a length of 10 mm, a width of 5 mm, and a thickness of 50 μm was clamped by heat sealing to obtain the negative electrode tab lead 210.

(Producing the Power Storage Device 1)

As the bare cell 120, a bare cell having the same structure as the one used in Example 1 was used. Further, using the bare cell used in Example 1, while leaving a region at a portion in the positive electrode side metal foil 23 where the positive electrode active material was not applied, pan end portion of the positive electrode tab lead 200 (an end portion that was not covered with the insulation film 202) was welded to the non-applied region using an ultrasonic joining method, and while also leaving a region at a portion in the negative electrode side metal foil 27 where the negative electrode active material was not applied, an end portion of the negative electrode tab lead 210 (an end portion that was not covered with the insulation film 212) was welded to the non-applied region using an ultrasonic joining method to obtain a bare cell 120 having tab leads. The positive electrode tab lead 200 and the negative electrode tab lead 210 were arranged on the same side of the bare cell 120 (see FIG. 14A).

Next, the first laminate external member having a width of 50 mm was cut into 275 mm width, and in a same manner as the first outer packaging of Example 1, bulging was performed using the forming female die 64, the forming male die 63, and the pressing die 65, to obtain the first laminate external member 161 in which 6 bare cell accommodation formed concave portions 166 having a length of 40 mm, a width 40 mm, and a depth of 4 mm were formed (see FIG. 14B). The width of the partition sealing portions 132 between the adjacent bare cell accommodation formed concave portions 166 was 5 mm. The inner surface of the bare cell accommodation formed concave portion 166 was a nonoriented polypropylene film 107.

Next, on the top surface of the first laminate external member 161 in which the bare cells 120 were accommodated inside each bare cell accommodation formed concave portion 166 (surface of the nonoriented polypropylene film layer 107), the flat second laminate external member 162 was laminated with the nonoriented polypropylene film layer 117 on the inside. At this time, all of the positive electrode tab lead 200 and the negative electrode tab lead 210 joined to the bare cell 120 were aligned on the same side (side) and the insulation films 202 and 212 were arranged at a region corresponding to the periphery sealing portion 131 (see FIG. 14A). Next, by pinching with an upper seal plate 71 and a lower seal plate 72 (with receiving concave portion 73) heated to 200° C. and hot pressing for 3 seconds with a pressure of 0.3 Mpa, the polypropylene layer 107 of the first laminate external member 161 and the polypropylene layer 117 of the second laminate external member 162 were heat sealed and joined to form the periphery sealing portion 131 and the partition sealing portion 132.

A temporary sealing was performed by performing the heat seal joining first for three of the four sides corresponding to the peripheral edge portions of each of the individual spaces 133. That is, the part corresponding to the side on the upper side was not yet sealed and was open (reference drawing: FIG. 14A).

Next, 5 mL of an electrolyte in which lithium hexafluorophosphate ($LiPF_6$) was dissolved at a density of 1 mol/L in a mixed solvent in which ethylene carbonate (EC), dimethylcarbonate (DMC), ethyl methyl carbonate (EMC) were blended in equal volume ratio was injected into each individual space 133 from the unsealed parts using injection syringes.

Then, after connecting each of the positive electrode tab leads 200 from the 6 bare cells 120 with conductor wires and connecting each of the negative electrode tab leads 210 from the 6 bare cells 120 with a conductor wire, charging was performed until 4.2 V of battery voltage was generated between the positive electrode tab lead 200 and the negative electrode tab lead 210, and after gas was generated from the electrodes, separator, etc., and under 3.0 V electric discharge condition and decompressed state at 0.086 MPa, by pinching the remaining one side of the unsealed portion from top and bottom with a pair of heat plates at 200° C. at a pressure of 0.3 MPa and performing heat sealing for 3 seconds, it was completely sealed and joined and a battery (power storage device) 1 having a structure as shown in FIG. 14 and a battery capacity of 3500 mAh was obtained.

Evaluation was performed for each of the batteries in Examples 1 and 2 and the Comparative Example 1 obtained in the aforementioned manner based on the following evaluation method.

<Evaluation Method of Bending Workability>

Figures 13A, 13B:
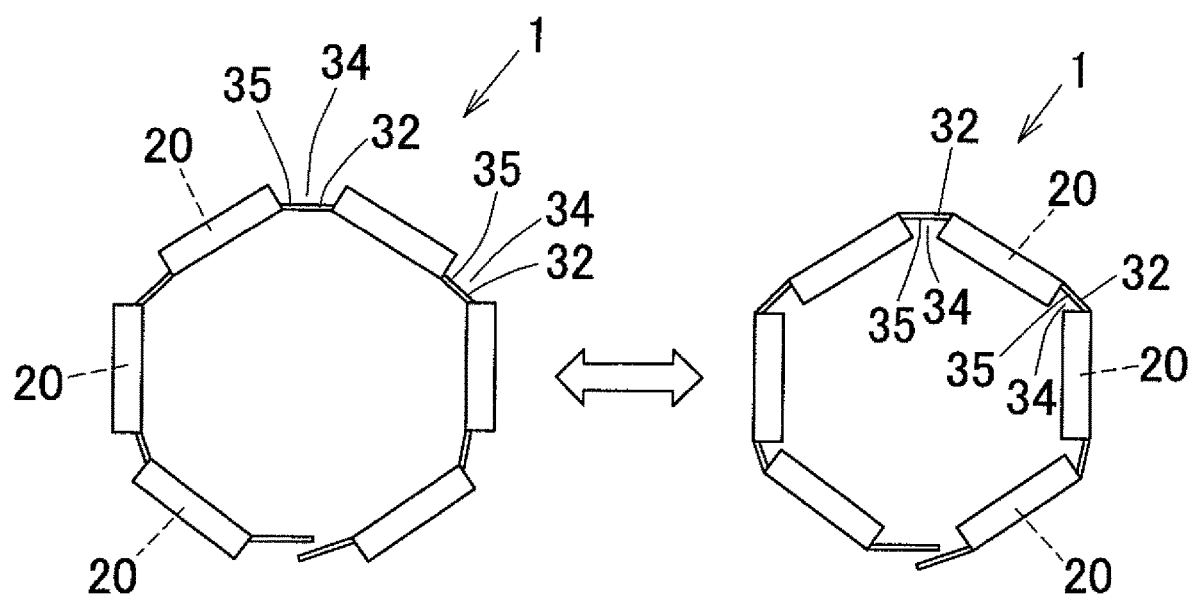

As shown in FIG. 13(A), when a bending operation to bring a state in which the bottom surface 35 of the concave portions 34 of the battery (partition sealing portion 32) were inward and bent annularly to a state in which, as shown in FIG. 13B, the bottom surface 35 of the concave portion 34 of the battery (partition sealing portion 32) were outward and bent annularly and returning again to a state of FIG. 13A is 1 cycle, such a bending operation was performed 1,000 cycles for each battery, and "o" was given when the bending operation could be performed with no difficulty and "x" was given when the bending operation was difficult.

<Battery Voltage and Battery Capacity Before and after Bending Test>

After measuring the voltage and the battery capacity of each battery before performing the aforementioned bending operation, the aforementioned 1,000 cycles of the bending operation were performed, and the voltage and the battery capacity of each battery after the bending operation was measured. These measured values are shown in Table 1.

TABLE 1

|  | Number of arranged tab leads (pieces) | Evaluation Result of Bending Workability | Voltage and Battery Capacity of Battery Before and After Bending Test | |
|---|---|---|---|---|
|  |  |  | Before Bending Test | After Bending Test |
| Example 1 | 0 | o | 4.2 V/3450 mA | 4.2 V/3430 mA |
| Example 2 | 0 | o | 4.2 V/3480 mA | 4.2 V/3450 mA |
| Comparative Example 1 | 12 | o | 4.2 V/3460 mA | 4.2 V/3440 mA |

The battery (power storage device) of Examples 1 and 2 of the present disclosure are significantly lighter in comparison to the battery of Comparative Example 1 in which multiple tab leads are provided. Further, the battery (power storage device) of Examples 1 and 2 of the present disclosure is sufficiently thinner in comparison to the battery of the Comparative Example 1 in which the positive and negative tab leads are welded to the respective positive and negative electrode parts, and the thicknesses are increased by the welded portions.

Further, as it is clear from Table 1, the battery (power storage device) of the Examples 1 and 2 of the present disclosure can be bending operated freely, and there is no change in the battery voltage and the battery capacity after performing 1000 cycles the bending operation, which makes it excellent in bending durability.

Further, the battery (power storage device) of the Examples 1 and 2 of the present disclosure has a discharge capacity ratio of 100% immediately after charging and a discharge capacity ratio of 92% after being left under 80° C., which is at a level that causes no problems in comparison to a conventional lithium ion battery (a lithium ion battery using a general metallic can as the outer packaging), and has an inner resistance value of 30 mΩ, which is suppressed to be low.

As specific examples of the power storage device according to the present disclosure, for example:

a bendable electrochemical device such as a lithium secondary battery (lithium ion battery, lithium polymer battery, etc.);

a bendable lithium ion capacitor; and a bendable electric double layer capacitor, etc.; can be exemplified.

Since the power storage device according to the present disclosure can be repeatedly bent and made high capacity, for example, it can be suitably used for a power source of thin home electric devices which are bent and operated, such as a smart phone, smart watch, etc., but it is not especially limited to such usage. Further, it can be suitably used as a backup power source, etc., for bendable type mobile phones, smart phones, etc.

Further, a module made of the power storage device of the present disclosure or a cylindrically structured power storage device module that is a module in which a plurality of the power storage devices of the present disclosure is laminated in the thickness direction can be used for, for example, a battery for electronic cigarettes, a battery for penlights, an auxiliary battery for computers, etc.

It should be understood that the terms and expressions used herein are used for explanation and have no intention to be used to construe in a limited manner, do not eliminate any equivalents of features shown and mentioned herein, and allow various modifications falling within the claimed scope of the present invention.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive.

The invention claimed is:

1. A power storage device comprising:
a first external member including at least a first metal foil layer;
a second external member including at least a second metal foil layer; and
at least one bare cell including a positive electrode portion in which a positive electrode active material layer is laminated on one surface of a positive electrode side metal foil, a negative electrode portion in which a negative electrode active material layer is laminated on one surface of a negative electrode side metal foil, and a separator arranged between the positive electrode portion and the negative electrode portion, wherein
the at least one bare cell includes a plurality of bare cells,
a peripheral edge region of one surface of the first metal foil layer and a peripheral edge region of one surface of the second metal foil layer are joined via a periphery sealing portion containing a thermoplastic resin,
in an internal space surrounded by the first metal foil layer, the second metal foil layer, and the periphery sealing portion, the plurality of bare cells are separated from each other along a length direction of the power storage device,
a partition region between adjacent bare cells on the one surface of the first metal foil layer and a partition region between adjacent bare cells on the one surface of the second metal foil layer are joined via a partition sealing portion containing a thermoplastic resin,
an internal space surrounded by the first metal foil layer, the second metal foil layer, and the periphery sealing portion is divided into a plurality of independent individual spaces by the partition sealing portion,
at least a part of a region of the one surface of the first metal foil layer corresponding to each individual space is provided with a first metal foil inner exposed portion in which the first metal foil is exposed, and in each individual space, the first metal foil inner exposed portion and the positive electrode portion of the bare cell are electrically connected,
at least a part of a region of the one surface of the second metal foil layer corresponding to each individual space is provided with a second metal foil inner exposed portion in which the second metal foil is exposed, and in each individual space, the second metal foil inner exposed portion and the negative electrode portion of the bare cell are electrically connected,
in each individual space, the bare cell and an electrolyte impregnated in the bare cell are encapsulated,
the first external member includes the first metal foil layer and a first insulation resin film laminated on other surface of the first metal foil layer,
the second external member includes the second metal foil layer and a second insulation resin film laminated on other surface of the second metal foil layer,
at one end portion of the power storage device in the length direction of the power storage device, the first metal foil layer is provided with a first metal foil extended portion extending outward beyond the second metal foil layer in the length direction so that the first metal foil layer is exposed at the first metal foil extended portion to form a positive electrode terminal,
at another end portion of the power storage device in the length direction of the power storage device, the second metal foil layer is provided with a second metal foil extended portion extending outward beyond the first metal foil layer in the length direction so that the second metal foil layer is exposed at the second metal foil extended portion to form a negative electrode terminal, and
the plurality of bare cells are parallel with each other along the length direction of the power storage device.

2. The power storage device as recited in claim 1, wherein
the other surface of the first metal foil layer at the first metal foil extended portion is exposed to form the positive electrode terminal, and
the other surface of the second metal foil layer at the second metal foil extended portion is exposed to form the negative electrode terminal.

3. The power storage device as recited in claim 1, wherein an inwardly recessed concave portion is formed at a region of at least one of external members among the first external member and the second external member, the region corresponding to the partition sealing portion.

4. The power storage device as recited in claim 1, wherein the bare cell is structured so as to include a rolled laminated body in which the positive electrode portion, the separator, the negative electrode portion, and the separator are laminated in this order.

5. The power storage device as recited in claim 1, wherein the one surface of the first metal foil layer at the first metal foil extended portion is exposed to form the positive electrode terminal, and the one surface of the second metal foil layer at the second metal foil extended portion is exposed to form the negative electrode terminal.

* * * * *